(12) United States Patent
Faulkner et al.

(10) Patent No.: US 11,212,326 B2
(45) Date of Patent: Dec. 28, 2021

(54) ENHANCED TECHNIQUES FOR JOINING COMMUNICATION SESSIONS

(71) Applicant: Microsoft Technology Licensing, LLC, Redmond, WA (US)

(72) Inventors: Jason Thomas Faulkner, Seattle, WA (US); Kenton O'Hara, Bristol (GB); Ewin Davis Kannuthottiyil, Prague (CZ); Eric Randall Sexauer, Woodinville, WA (US); Edward Sean Lloyd Rintel, Cambridge (GB); Thaddeus Scott, Kirkland, WA (US); Kevin Morrison, Arlington, MA (US); Robert Corish, London (GB); Anthony Wieser, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 146 days.

(21) Appl. No.: 15/480,325

(22) Filed: Apr. 5, 2017

(65) Prior Publication Data
US 2018/0124128 A1 May 3, 2018

Related U.S. Application Data

(60) Provisional application No. 62/415,403, filed on Oct. 31, 2016.

(51) Int. Cl.
*H04L 29/06* (2006.01)
*H04N 7/14* (2006.01)
(Continued)

(52) U.S. Cl.
CPC ........ *H04L 65/1093* (2013.01); *H04L 65/403* (2013.01); *H04L 65/4015* (2013.01);
(Continued)

(58) Field of Classification Search
CPC ..... H04L 65/10; H04L 67/10; H04L 65/1093; H04L 65/4015; H04L 65/403; H04L 67/18; H04L 67/303; H04L 67/36; H04M 3/10
(Continued)

(56) References Cited

U.S. PATENT DOCUMENTS 7,279,060 B2   10/2007   Chen et al.
7,554,571 B1   6/2009    Beck
(Continued)

FOREIGN PATENT DOCUMENTS

CN   103053150 A   4/2013
CN   104685864 A   6/2015
(Continued)

OTHER PUBLICATIONS

He, Li-wei, and Zhengyou Zhang. "Real-time whiteboard capture and processing using a video camera for teleconferencing." In Proceedings.(ICASSP'05). IEEE International Conference on Acoustics, Speech, and Signal Processing, 2005., vol. 2, p. ii-1113. IEEE, 2005. (Year: 2005).*

(Continued)

*Primary Examiner* — Suraj M Joshi
(74) *Attorney, Agent, or Firm* — Newport IP, LLC; Scott Y. Shigeta

(57) ABSTRACT

The present disclosure provides a number of techniques for enhancing a user's experience when joining teleconference sessions. When multiple users join a teleconference session using separate devices, a system identifies devices that are co-located. The co-located devices are identified by the use of a combination of data including, but not limited to social signals, audio signal and other location data. At least one device of the co-located devices, has a first control set for controlling a teleconference session and other devices of the
(Continued)

co-located devices have a second control set for sharing content. The at least one device also has one set of streams and the other devices see a subset of those streams or other streams based on an activity level. In addition, the present disclosure provides a number of techniques for enabling users to use multiple devices to share content.

20 Claims, 20 Drawing Sheets

(51) Int. Cl.
| | |
|---|---|
| H04N 7/15 | (2006.01) |
| H04M 7/00 | (2006.01) |
| H04L 29/08 | (2006.01) |
| H04M 3/56 | (2006.01) |
| H04M 3/42 | (2006.01) |
| G06F 3/0482 | (2013.01) |

(52) U.S. Cl.
CPC ............ *H04L 67/18* (2013.01); *H04L 67/303* (2013.01); *H04L 67/36* (2013.01); *H04M 3/42263* (2013.01); *H04M 3/568* (2013.01); *H04M 7/0027* (2013.01); *H04N 7/147* (2013.01); *H04N 7/15* (2013.01); *G06F 3/0482* (2013.01); *H04L 67/306* (2013.01); *H04M 3/563* (2013.01); *H04M 3/564* (2013.01); *H04M 2203/2094* (2013.01); *H04N 2007/145* (2013.01)

(58) Field of Classification Search
USPC .................................................. 709/203–206
See application file for complete search history.

(56) References Cited

U.S. PATENT DOCUMENTS

| | | | |
|---|---|---|---|
| 8,081,205 B2 | 12/2011 | Baird et al. | |
| 8,350,891 B2 | 1/2013 | Khat et al. | |
| 8,379,077 B2 | 2/2013 | Wu et al. | |
| 8,503,651 B2 * | 8/2013 | Virolainen | H04L 65/605 |
| | | | 379/202.01 |
| 8,786,517 B2 | 7/2014 | Lewin et al. | |
| 8,896,651 B2 | 11/2014 | Chu et al. | |
| 8,934,382 B2 * | 1/2015 | Rodman | H04M 3/567 |
| | | | 370/261 |
| 9,088,694 B2 | 7/2015 | Navon et al. | |
| 9,131,333 B2 | 9/2015 | Gai et al. | |
| 9,148,627 B2 | 9/2015 | Anderson et al. | |
| 9,172,908 B2 | 10/2015 | Kert et al. | |
| 9,369,672 B2 | 6/2016 | Hiller et al. | |
| 9,400,895 B2 | 7/2016 | Dadu et al. | |
| 9,445,054 B2 | 9/2016 | Kato | |
| 9,467,657 B2 | 10/2016 | Decker et al. | |
| 9,609,030 B2 * | 3/2017 | Sun | H04N 7/142 |
| 9,615,058 B2 * | 4/2017 | Mattson | H04N 7/15 |
| 9,801,219 B2 | 10/2017 | Sonnino et al. | |
| 10,321,093 B2 | 6/2019 | Duckworth et al. | |
| 10,362,272 B1 | 7/2019 | Van Os et al. | |
| 10,368,032 B2 | 7/2019 | Visosky | |
| 10,824,384 B2 | 11/2020 | Somaiah et al. | |
| 10,838,681 B2 | 11/2020 | Watson et al. | |
| 10,841,174 B1 | 11/2020 | Ely et al. | |
| 10,999,331 B1 | 5/2021 | Marchand et al. | |
| 2003/0048174 A1 | 3/2003 | Stevens et al. | |
| 2003/0055977 A1 | 3/2003 | Miller | |
| 2006/0092269 A1 | 5/2006 | Baird et al. | |
| 2006/0132473 A1 | 6/2006 | Fuller et al. | |
| 2006/0224882 A1 | 10/2006 | Chin | |
| 2007/0112942 A1 | 5/2007 | Moquin et al. | |
| 2007/0150953 A1 | 6/2007 | Hamid et al. | |
| 2007/0300165 A1 | 12/2007 | Haveliwala et al. | |
| 2008/0043986 A1 | 2/2008 | Darby et al. | |
| 2008/0160977 A1 * | 7/2008 | Ahmaniemi | H04L 12/1822 |
| | | | 455/416 |
| 2008/0281971 A1 | 11/2008 | Leppanen et al. | |
| 2010/0009719 A1 | 1/2010 | Oh et al. | |
| 2011/0119389 A1 | 5/2011 | Cavin et al. | |
| 2011/0271207 A1 * | 11/2011 | Jones | H04W 4/21 |
| | | | 715/753 |
| 2011/0292161 A1 | 12/2011 | Sharon et al. | |
| 2012/0280790 A1 | 11/2012 | Gerhardt et al. | |
| 2012/0284643 A1 * | 11/2012 | Sitrick | G06F 17/241 |
| | | | 715/753 |
| 2012/0297306 A1 | 11/2012 | Hassan et al. | |
| 2013/0065526 A1 | 3/2013 | Pottier et al. | |
| 2013/0106976 A1 | 5/2013 | Chu et al. | |
| 2013/0111555 A1 | 5/2013 | Leneel | |
| 2013/0169526 A1 | 7/2013 | Gai et al. | |
| 2013/0214995 A1 | 8/2013 | Lewin et al. | |
| 2013/0219288 A1 | 8/2013 | Rosenberg | |
| 2013/0219303 A1 | 8/2013 | Eriksson et al. | |
| 2013/0295882 A1 | 11/2013 | Zhao | |
| 2014/0006495 A1 | 1/2014 | Adderly et al. | |
| 2014/0026070 A1 | 1/2014 | Tandon et al. | |
| 2014/0028726 A1 | 1/2014 | Dave et al. | |
| 2014/0155169 A1 | 6/2014 | Crevin et al. | |
| 2014/0157185 A1 | 6/2014 | Moromisato et al. | |
| 2014/0282967 A1 | 9/2014 | Maguire et al. | |
| 2014/0313282 A1 | 10/2014 | Ma et al. | |
| 2014/0315489 A1 | 10/2014 | Lee | |
| 2014/0340468 A1 | 11/2014 | Winterstein | |
| 2014/0344446 A1 | 11/2014 | Rjeili et al. | |
| 2014/0368603 A1 | 12/2014 | Kert et al. | |
| 2015/0124950 A1 | 5/2015 | Koenig | |
| 2015/0248468 A1 | 9/2015 | Cheng | |
| 2015/0271273 A1 | 9/2015 | Glass et al. | |
| 2015/0347738 A1 | 12/2015 | Ulrich et al. | |
| 2016/0212181 A1 * | 7/2016 | Zhang | H04L 65/403 |
| 2016/0241605 A1 | 8/2016 | Taboriskiy et al. | |
| 2016/0261658 A1 | 9/2016 | Taylor et al. | |
| 2016/0323290 A1 | 11/2016 | Stead et al. | |
| 2016/0342784 A1 | 11/2016 | Beveridge et al. | |
| 2016/0366713 A1 | 12/2016 | Sonnino et al. | |
| 2016/0378417 A1 | 12/2016 | Kenjalkar | |
| 2017/0097678 A1 | 4/2017 | Mclean | |
| 2017/0104831 A1 | 4/2017 | Fransen | |
| 2017/0171699 A1 | 6/2017 | Jin et al. | |
| 2017/0244811 A1 | 8/2017 | Mckenzie et al. | |
| 2017/0311365 A1 | 10/2017 | Molettiere et al. | |
| 2018/0267774 A1 | 9/2018 | Williams et al. | |
| 2018/0270340 A1 | 9/2018 | Ahmad et al. | |
| 2019/0173745 A1 | 6/2019 | Rjeili et al. | |
| 2019/0321732 A1 | 10/2019 | Zimring et al. | |
| 2019/0332344 A1 | 10/2019 | Somaiah et al. | |
| 2019/0372988 A1 | 12/2019 | Schirdewahn et al. | |
| 2021/0004454 A1 | 1/2021 | Chester et al. | |
| 2021/0045169 A1 | 2/2021 | Pupakdee et al. | |
| 2021/0136129 A1 | 5/2021 | Ponnusamy et al. | |
| 2021/0136130 A1 | 5/2021 | Ponnusamy et al. | |
| 2021/0136846 A1 | 5/2021 | Ponnusamy et al. | |

FOREIGN PATENT DOCUMENTS

| | | | |
|---|---|---|---|
| CN | 105264883 A | 1/2016 | |
| CN | 105474653 A | 4/2016 | |
| CN | 105704426 A | 6/2016 | |
| EP | 1220501 B1 * | 7/2008 | ........... H04B 13/005 |
| EP | 2587799 A1 | 5/2013 | |
| WO | 0031608 A2 | 6/2000 | |
| WO | 2016149294 A1 | 9/2016 | |
| WO | 2016195825 A1 | 12/2016 | |

OTHER PUBLICATIONS

Hornler, et al., "Multi-Modal Activity and Dominance Detection in Smart Meeting Rooms", In Proceedings of the IEEE International Conference on Acoustics, Speech, and Signal Processing, Apr. 19, 2009, pp. 1777-1780.

(56) References Cited

OTHER PUBLICATIONS

Rudnicky, et al., "Intelligently Integrating Information from Speech and Vision Processing to Perform Light-weight Meeting Understanding", In Proceedings of International Workshop on Multimodal Multiparty Meeting Processing, Oct. 2005, pp. 79-84.
"Highfive Sees 300 Percent Growth in Video-Enabled Meeting Rooms", http://www.marketwired.com/press-release/highfive-sees-300-percent-growth-in-video-enabled-meeting-rooms-2158891.htm, Published on: Sep. 15, 2016, 3 pages.
"How do I share my screen in Skype for Windows desktop?", https://supportskype.comien/faq/FA10215/how-do-i-share-my-screen-in-skype-for-windows-desktop, Retrieved on: Oct. 21, 2016, 5 pages.
"Four Ways Polycom is Redefining Video Collaboration", http://www.polycom.com/products-services/realpresence-plafform/realpresence-web-suite/redefining-video-collaboration.html, Retrieved on: Oct. 21, 2016, 4 pages.
"Share your screen", https://www.uberconference.com/screensharing, Retrieved on: Oct. 21, 2016, 5 pages.
"Screen share—free. With WebEx Meetings", https://www.webex.com/features/screen-share.html, Retrieved on: Oct. 21, 2016, 5 pages.
"Instructions", https://www.freeconferencecall.com/instructions, Published on: 2001, 11 pages.
"Share your screen during a Hangout", https://supportgoogle.comihangouts/answer/1660627?hl=en, Retrieved on: Oct. 21, 2016, 2 pages.
"GoToMeeting | Global Customer Support", http://support.citrixonline.com/en_US/meeting/help_files/G2M040004, Retrieved on: Oct. 21, 2016, 7 pages.
"International Search Report and Written Opinion Issued in PCT Application No. PCT/US2017/057947", dated Feb. 8, 2018, 14 Pages.
"International Search Report and Written Opinion Issued in PCT Application No. PCT/US2017/057948", dated Feb. 8, 2018, 15 Pages.
"Non Final Office Action Issued in U.S. Appl. No. 15/480,332", dated Jun. 27, 2019, 16 Pages.
Liu, et al., "Do Handheld Devices Facilitate Face-to-Face Collaboration? Handheld Devices with Large Shared Display Groupware to Facilitate Group Interactions", In Journal of Computer Assisted Learning 23, No. 4, May 22, 2007, pp. 285-299.
"Final Office Action Issued in U.S. Appl. No. 15/480,332", dated Jan. 29, 2020, 20 Pages.
"Non Final Office Action Issued in U.S. Appl. No. 15/480,332", dated Aug. 24, 2020, 15 Pages.
"First Office Action and Search Report Issued in Chinese Patent Application No. 201780067116.9", dated May 26, 2020, 15 Pages.
Yang, et al., "New Business Development in Triple-Play", In the Journal of Telecommunications Science, vol. 27, Issue 3, Mar. 15, 2011, 6 pages.
"Notice of Allowance Issued in U.S. Appl. No. 16/724,111", dated Feb. 16, 2021, 6 Pages.
"Changing Your Own Video Layout", Retrieved from: https://documentation.avaya.com/bundle/UsingXTSeries_r91/page/xt1000_ug_calls_changeVideoLayout.html, Retrieved Date: Apr. 21, 2020, 3 Pages.
"Lock Your Windows 10 PC Automatically When You Step Away From It", Retrieved from: https://web.archive.org/web/20190518143337/https:/support.microsoft.com/en-in/help/4028111/windows-lock-your-windows-10-pc-automatically-when-you-step-away-from, May 18, 2019, 02 Pages.
"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Apr. 21, 2020, 3 Pages.
"ViewSplit-Display Layout Software", Retrieved from: https://web.archive.org/web/20170318042724/https:/www.viewsonic.com/us/viewsplit.html, Mar. 18, 2017, 4 Pages.
"Non Final Office Action Issued in U.S. Appl. No. 16/724,111", dated Nov. 4, 2020, 19 Pages.
"Final Office Action Issued in U.S. Appl. No. 16/724,116", dated Oct. 8, 2020, 13 Pages.
"Non Final Office Action Issued in U.S. Appl. No. 16/724,116", dated Jun. 11, 2020, 15 Pages.
"Second Office Action and Search Report Issued in Chinese Patent Application No. 201780067116.9", dated Feb. 10, 2021, 14 Pages.
"International Search Report and the Written Opinion Issued in PCT Application No. PCT/US20/055451", dated Jan. 15, 2021, 11 Pages.
"International Search Report and Written Opinion Issued in PCT Application No. PCT/US20/055445", dated Jan. 28, 2021, 11 Pages.
"International Search Report and Written Opinion Issued in PCT Application No. PCT/US20/055444", dated Feb. 2, 2021, 13 Pages.
"Non-Final Office Action Issued in U.S. Appl. No. 16/724,116", dated Apr. 5, 2021, 15 Pages.
"Final Office Action Issued in U.S. Appl. No. 15/480,332", dated Jun. 4, 2021, 18 Pages.
"Office Action Issued in Indian Patent Application No. 201947013660", dated Jun. 27, 2021, 7 Pages.
"Non-Final Office Action Issued in U.S. Appl. No. 16/714,329", dated Jun. 28, 2021, 21 Pages.
"Notice of Allowance Issued in U.S. Appl. No. 16/724,111", dated Jul. 22, 2021, 3 Pages.
"Notice of Allowance Issued in U.S. Appl. No. 16/724,111", dated Jul. 7, 2021, 6 Pages.
Krumm, et al., "The NearMe Wireless Proximity Server", In Proceedings of the International Conference on Ubiquitous Computing, Sep. 7, 2004, pp. 283-300.
"Office Action Issued in European Patent Application No. 17794863.5", dated Sep. 30, 2021, 11 Pages.
"Final Office Action Issued in U.S. Appl. No. 16/724,116", dated Sep. 3, 2021, 15 Pages.

* cited by examiner

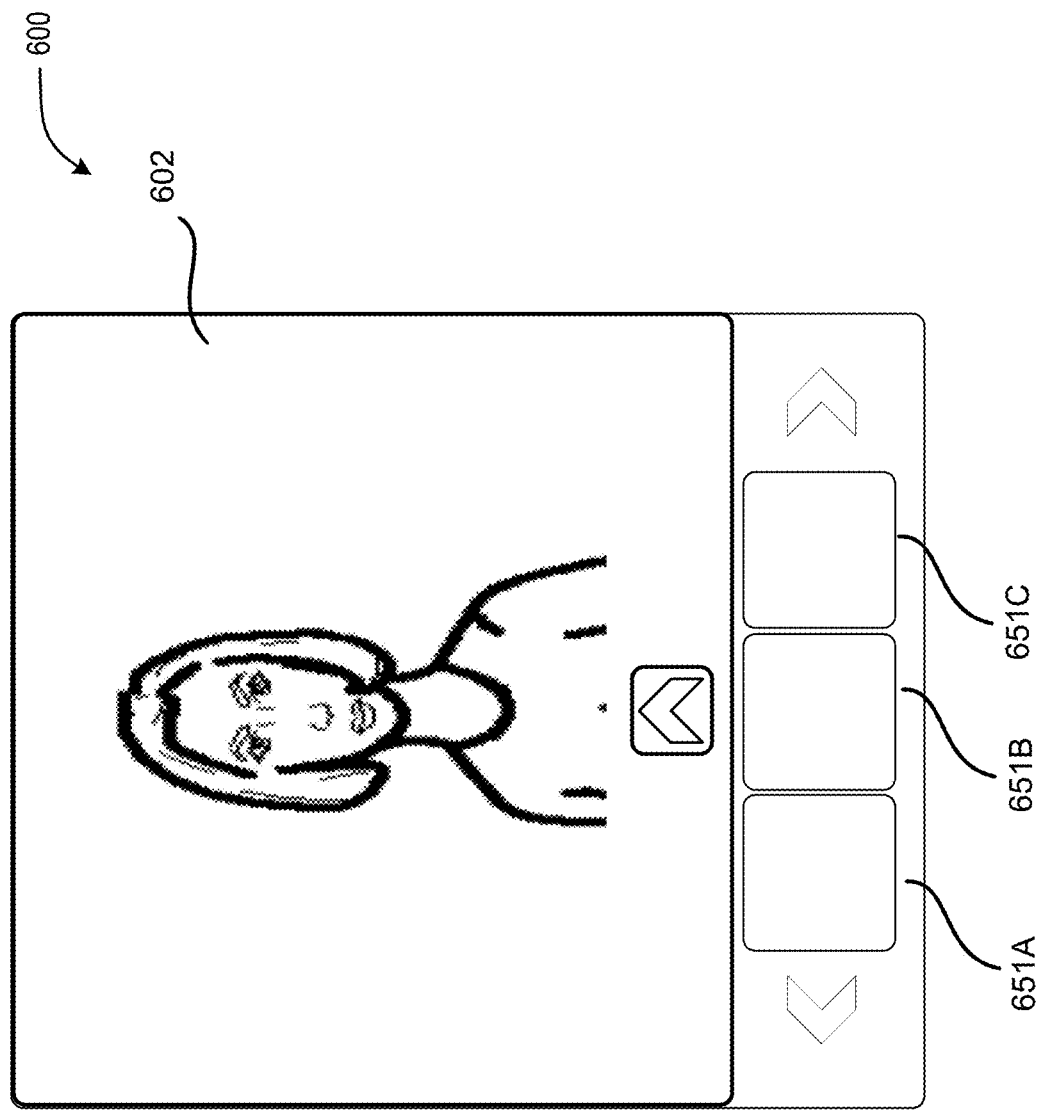

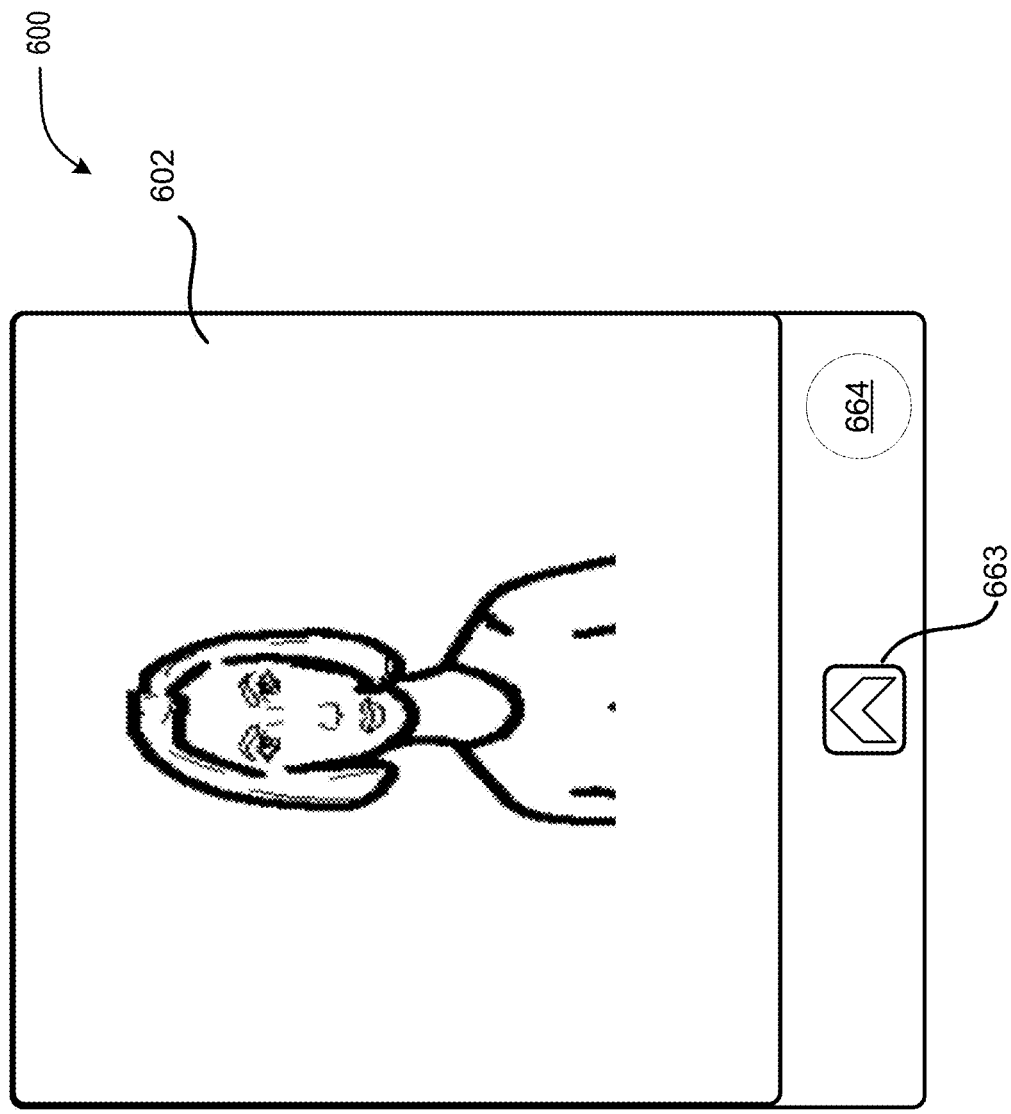

ENHANCED TECHNIQUES FOR JOINING COMMUNICATION SESSIONS

CROSS REFERENCE TO RELATED APPLICATION

This patent application claims the benefit of U.S. Provisional Patent Application Ser. No. 62/415,403 filed Oct. 31, 2016, entitled "ENHANCED TECHNIQUES FOR JOINING TELECONFERENCING SESSIONS," which is hereby incorporated in its entirety by reference.

BACKGROUND

Communication and collaboration are key aspects in people's lives, both socially and in business. Communication and collaboration tools have been developed with the aim of connecting people to share experiences. In many cases, the aim of these tools is to provide, over a network, an experience which mirrors real life interaction between individuals and groups of people. Interaction is typically provided by audio and/or visual elements.

Such tools include instant messaging, voice calls, video calls, group chat, shared desktop, shared media and content, shared applications, etc. Such tools can perform capture, manipulation, transmission, and reproduction of audio and visual elements, and use various combinations of such elements in an attempt to provide a collaborative environment. A user can access such tools at a user device which may be provided by a laptop or desktop computer, mobile phone, tablet, games console, etc. Such devices can be linked in a variety of possible network architectures, such as peer-to-peer architectures or client-server architectures or a hybrid, such as a centrally managed peer-to-peer architecture. In general, some or all of these architectures can facilitate a teleconference session to attempt to enable rich communication and collaboration somewhat similar to an in-person collaboration meeting.

However, when a user joins a teleconference session, some current technologies can leave much to be desired. For example, when multiple users join a teleconference session, individual device features may result in users experiencing a duplication of content. In some cases, although many users are in the same room, each one of their devices shows the same shared content. This duplication isn't the best use of resources. In addition, if users attempt to join a teleconference session with other users in the same room, the devices can cause audio feedback issues, which can be disruptive to the meeting.

As such, there is a need for improved teleconference technologies that address these and other issues.

SUMMARY

The present disclosure provides a number of techniques for enhancing a user's experience when joining teleconference sessions. When multiple users join a teleconference session using separate devices, a system identifies devices that are co-located. The co-located devices are identified by the use of a combination of data including, but not limited to, social signals, audio signal and other data indicating a location. At least one device of the co-located devices, has a first control set for controlling a teleconference session and other devices of the co-located devices have a second control set for sharing content. In some embodiments, the at least one device also has one set of selected streams, e.g., a stage view, and the other devices see a subset of those streams or other streams based on an activity level. In addition, the present disclosure provides a number of techniques for enabling users to use multiple devices to share content.

In some configurations, a teleconference system can receive control data from a plurality of computing devices. The control data can indicate information related to locations and statuses of the computing devices and/or associated users. Additionally, each computing device of the plurality of computing devices can be associated with a different user identity for accessing a teleconference session. Accordingly, the received control data can also indicate an associated user identity.

The teleconference system can also determine a subset of computing devices from the plurality of computing devices based on at least one of, or a combination of, social signals, audio signals, or positioning data. The social signals, audio signals, and/or positioning data can be a portion of the received control data, according to some aspects. According to other aspects, the social signals, audio signals, and/or positioning data can be separately received data depending upon a state of the teleconference session or other configuration. In brief, social signals can comprise social network signals, calendar signals, contact listing signals, and contact relationship signals. Positioning data can be based on a positioning device, such as a GPS device or other device, and audio signals can be based on a level of detected interference. The combination of such signals can provide a higher level of accuracy in determining co-located devices versus the use of a single signal resource.

The teleconference system can also determine a primary computing device from the subset of computing devices and one or more secondary computing devices from the subset of computing devices. Generally, a primary computing device may be a computing device arranged to anchor an immersive experience for the teleconference session. The one or more secondary computing devices can be similar in arrangement to the primary computing device, or can be different forms of computing devices. Generally, the secondary computing devices can be computing devices arranged to present a reduced, lightweight, or otherwise streamlined portion of teleconference data while avoiding distractions, interference, and other elements that can disrupt the teleconference session.

The teleconference system can communicate a first teleconference data to the primary computing device. The first teleconference data can cause the primary computing device to display a first user interface arrangement having core teleconference control elements. For example, the core teleconference control elements can be configured to control a state of the teleconference session.

The teleconference system can also communicate a second teleconference data to the one or more secondary computing devices. The second teleconference data can cause the one or more secondary computing devices to display a second user interface arrangement having sharing control elements. For example, the sharing control elements can be configured to receive a selection of content to share from the one or more secondary computing devices.

According to another aspect, a teleconference system can receive data indicating locations of a plurality of computing devices. These computing devices can be associated with a plurality of users desiring to join one or more teleconference sessions. For example, a group or subset of the computing devices may all attempt to join a single teleconference session. Additionally, in one example, the data indicating the locations of the plurality of computing devices can indicate, at least partially, general locations of the computing devices.

In one illustrative example, the data indicating locations of the plurality of computing devices comprises social signals, audio signals, or positioning data. The data indicating locations of the plurality of computing devices can therefore include at least one of data defining a GPS position, data defining a Bluetooth signal strength, data defining a Wi-Fi triangulation, data defining an ultrasound watermarking, or data defining a characteristic of a near field communication signal. Additionally, the social signals can comprise social network signals, calendar signals, contact listing signals, and contact relationship signals. Audio signals may be detected or generated from individual user devices to determine a level of interference between devices. Devices detecting interference can be used to determine the relative position or a distance between devices. It can be appreciated that the signals, e.g., social signals, audio signals, and positioning data, can be used individually or used in combination.

Utilizing the received data, the teleconference system can determine that a subset of computing devices of the plurality of computing devices are co-located based on the data indicating locations. In one illustrative example, the teleconference system can interpret the data and implement a thresholding algorithm to identify one or more groupings of computing devices within a threshold distance of each other. Upon determining that a portion of one co-located grouping are attempting to join a single teleconference session, the teleconference system may identify that portion as the subset of devices that are co-located.

Once the co-located subset is determined, the teleconference system can select a primary computing device from the subset of computing devices for operating in a primary mode of operation and one or more secondary computing devices from the subset of computing devices for operating in a secondary mode of operation.

Following this selection, the teleconference system can generate teleconference data associated with a teleconference session. In one illustrative example, the teleconference data can include participant streams having video of one or more participants, and content streams having video or images of files, data structures, word processing documents, and other shareable content.

Having generated the teleconference data, the teleconference system may communicate a first selection of teleconference data to the primary device and a second selection (also referred to herein as a "sub-portion") of the teleconference data to the one or more secondary devices. The first selection of teleconference data can include a plurality of streams, which can comprise a primary view, a "stage view" of a session. The sub-portion of the teleconference data may have streams that are determined based on an activity level or other values. Accordingly, while primary devices may be the only devices receiving a first selection of teleconference data, the remaining devices may be configured to only receive a sub-portion. Thus, by efficiently communicating sub-portions of the teleconference data having related, and in some cases salient content, but non-duplicative content, the teleconference system can overcome many technical drawbacks associated with conventional teleconference systems.

Furthermore, in an additional illustrative example, two or more modes of operation may be established by the teleconference system. These modes of operation can include, for example, a primary mode of operation and a secondary mode of operation. Therefore, once a device enters a teleconference session, different types of contextual user interfaces can be displayed to allow users to access and share relevant information based on these modes of operation. For example, a first user interface arrangement having core teleconference control elements can be displayed at a primary device. The core teleconference control elements can be configured to control a state of the teleconference session. In addition, a second user interface arrangement having sharing control elements for enabling secondary users to readily select various types of media data to be shared by a device can be displayed using the secondary computing devices. The combination of the different user interface arrangements, control elements, and the use of the modes of operation allow users to join the teleconference sessions in a manner that reduces distractions while also allowing users to select and share the most relevant content.

As will be described in more detail below, several methods for selecting a primary device and secondary devices, and therefore establishment of the primary and secondary modes of operation, can be facilitated using the technologies described herein. For example, a primary device can be selected based on an order of the devices attempting to join the teleconference session. Thus, a first device to attempt to join can be selected as the primary device. In other aspects, the teleconference system can analyze priority values associated with one or more computing devices of the subset of computing devices to determine that the first computing device of the subset of computing devices has a priority value superseding priority values of the remaining computing devices of the subset of computing devices. In another example, the primary device and the secondary devices can be selected based on priority values assigned to individual devices. Thus, computers that are more suitable for becoming a primary device, such as a conference room computer, may be selected as a primary device versus a user's mobile device.

As will be described in more detail below, in addition to establishing a primary device, secondary devices, and primary and secondary modes of operation, the teleconference system can also manipulate components of the subset of devices, which include both the primary devices and the secondary devices, to enhance the teleconference session and limit disruption. For example, the teleconference system can remotely disable a camera of one or more computing devices of the remaining computing devices of the subset of computing devices. Additionally, the teleconference system can remotely disable an audio component of one or more devices of the remaining computing devices of the subset of computing devices. Other manipulation of these components can also be possible, for example, through selective activation to allow certain participants to "take the stage" or share content, to promote views based on activity levels, and other alternatives.

As will be described in greater detail below, the technologies described herein related to the teleconference system can be combined in multiple manners to enable participation of users in a variety of scenarios including scenarios where one or more users are co-located, remotely located, and otherwise located, while still enriching a teleconference session.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6A illustrates an example user interface arrangement of a computing device operating in a secondary mode of operation.

FIG. 6C illustrates an example user interface arrangement of a computing device operating in a secondary mode of operation.

DETAILED DESCRIPTION

Figure 1:
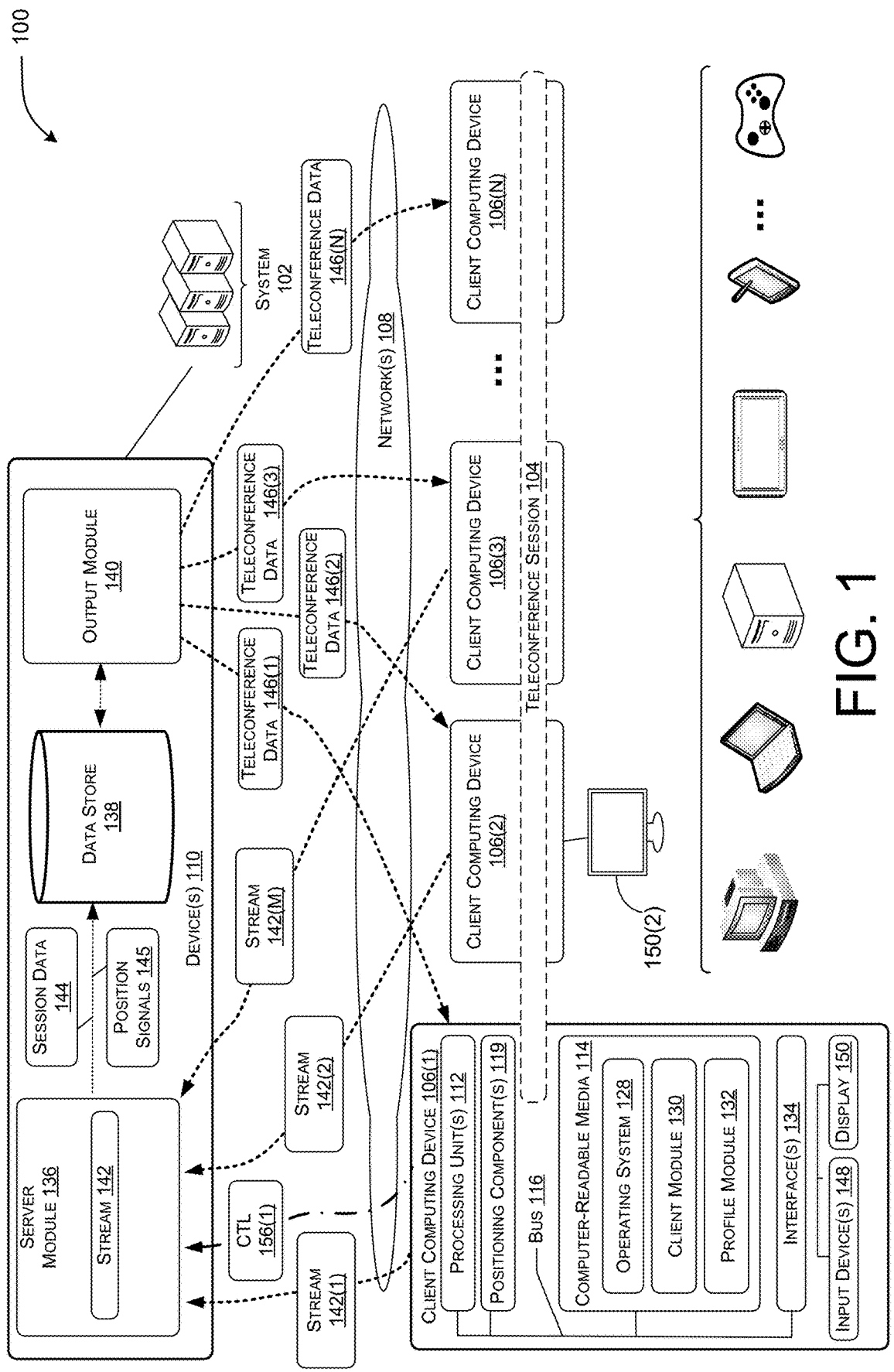
FIG. 1 is a diagram illustrating an example environment in which a system can operate to provide enhanced techniques for joining teleconference sessions.

The present disclosure provides a number of techniques for enhancing a user's experience when joining teleconference sessions. A teleconference system can receive control data and/or data indicating locations of a plurality of computing devices. These computing devices can be associated with a plurality of users desiring to join one or more teleconference sessions. For example, a group or subset of the computing devices may all attempt to join a single teleconference session. Additionally, in one example, the data indicating the locations of the plurality of computing devices can indicate, at least partially, general locations of the computing devices. Furthermore, each computing device of the plurality of computing devices can be associated with a different user identity for accessing a teleconference session.

In one illustrative example, the data indicating locations of the plurality of computing devices comprises one or more of social signals, audio signals, or positioning data. The data indicating locations of the plurality of computing devices can therefore include at least one of data defining a GPS position, data defining a Bluetooth signal strength, data defining a Wi-Fi triangulation, data defining an ultrasound watermarking, or data defining a characteristic of a near field communication signal. Additionally, the social signals can comprise social network signals, calendar signals, contact listing signals, and contact relationship signals.

Utilizing the received data, the teleconference system can determine a subset of computing devices of the plurality of computing devices that are co-located based on the data indicating locations. In one illustrative example, the teleconference system can interpret the data and implement a thresholding algorithm to identify one or more groupings of computing devices within a threshold distance of each other. Upon determining that co-located computing devices are attempting to join a single teleconference session, the teleconference system may analyze priority values associated with the user identities, priority values associated with the computing devices, and/or other attributes to determine a manner in which to have the computing devices join the teleconference session.

For example, once the co-located subset of computing devices is determined, the teleconference system can determine or select a primary computing device of the subset of computing devices. In general, the primary computing device can be used to anchor an immersive experience for the subset of computing devices and limit disruption caused by conventional teleconference systems. The teleconference system can also determine or select one or more secondary computing devices from the subset of computing devices.

Following this determination, the teleconference system can generate and communicate teleconference data associated with the teleconference session. In one illustrative example, the teleconference data can include participant streams having video of one or more participants and content streams having video or images of files, data structures, word processing documents, and other shareable content.

Having generated the teleconference data, the teleconference system may communicate the teleconference data to the primary computing device, and communicate a sub-portion of the teleconference data, e.g., select streams based on an associated activity level, to the one or more secondary computing devices. According to another aspect, the teleconference system can communicate a first teleconference data to the primary device and can communicate a second teleconference data to the one or more secondary computing devices.

Generally, the first teleconference data and the second teleconference data may be arranged differently. Accordingly, while the primary device is the only device receiving a first selection of teleconference data, the remaining devices receive a sub-portion or second teleconference data. Thus, by efficiently generating the teleconference data for different computing devices having related but non-duplicative content, the teleconference system of this illustrative example can overcome many technical drawbacks associated with conventional teleconference systems.

Furthermore, in an additional illustrative example, two or more modes of operation may be established by the teleconference system. These modes of operation can include, for example, a primary mode of operation and a secondary mode of operation. Therefore, once a device enters a teleconference session, different types of contextual user interfaces can be displayed for enabling users to access and share relevant information based on these modes of operation. The combination of the different control menus and the use of the modes of operation enable users to join the teleconference sessions in a way that reduces distractions while also allowing users to select and share the most relevant content.

As will be described in more detail below, several methods for selection of a primary device, and therefore establishment of the primary and secondary modes of operation, can be facilitated using the technologies described herein. For example, a primary device can be selected based on an order of the devices attempting to join the teleconference session. Thus, a first device to attempt to join can be selected as the primary device. In other aspects, the teleconference system can analyze priority values associated with one or more computing devices of the subset of computing devices to determine that the first computing device of the subset of computing devices has a priority value superseding priority values of the remaining computing devices of the subset of computing devices.

As will be described in more detail below, in addition to establishing a primary device and primary and secondary modes of operation, the teleconference system can also manipulate components of the subset of devices to enhance the teleconference session and limit disruption. For example, the teleconference system can remotely disable a camera of one or more computing devices of the subset of computing devices. Additionally, the teleconference system can remotely disable an audio component of one or more computing devices of the subset of computing devices. Other manipulation of these components can also be possible, for example, through selective activation to allow certain participants to "take the stage" or share content.

As will be described in greater detail below, the technologies described herein related to the teleconference system can be combined in multiple manners to enable participation of users in a variety of scenarios including scenarios where one or more users are co-located, remotely located, and otherwise located, while still enriching a teleconference session. Various examples, scenarios, and aspects are described below with reference to FIGS. 1-8.

In FIG. 1, a diagram illustrating an example of a teleconference system 100 is shown in which a system 102 can operate to provide a teleconference session 104 in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110 and the device(s) 110 and/or other components of the system 102 may include distributed computing devices that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK®, WEBEX®, GOTOMEETING®, GOOGLE HANGOUTS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Example networks support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phones, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses. The client computing device(s) 106 can also comprise one or more positioning components 119 for generating positioning data defining a location of a device 106. The location can be defined by a coordinate system, a vector system, or any other data format suitable for identifying a location of a device 106. The positioning data can also define a relative location of a device 106, which can include a distance between two computing devices 106 or a distance between two or more objects, such as a phone, speaker, microphone, etc. The positioning data can be generated by the positioning components 119 utilizing one or more suitable technologies which may include, but are not limited to, GPS technologies, Bluetooth technologies, Wi-Fi triangulation technologies, ultrasound watermarking technologies, Near Field Communication (NFC) technologies, and/or any other technology for determining a position or relative position of a device or object.

Executable instructions stored on computer-readable media 114 may include, for example, an operating system 128, a client module 130, a profile module 132, and other modules, programs, or applications that are loadable and executable by processing units(s) 112.

Client computing device(s) 106(1) through 106(N) may also include one or more interface(s) 134 to enable communications with other input devices 148 such as network interfaces, cameras, keyboards, touch screens, and pointing devices (mouse). For example, the interface(s) 134 can also enable communications between client computing device(s) 106(1) through 106(N) and other networked devices, such as device(s) 110 and/or devices of the system 102, over the network(s) 108. Such network interface(s) 134 may include one or more network interface controllers (NICs) (not shown) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 and the other client computing devices 106(2) through 106(N) to connect over the network 108.

The client module 130 of each client computing device 106(1) through 106(N) may include logic that detects user input and communicates control signals to the server module 136 to request changes in the teleconference session 104 on the display. For example, the client module 130 in the first client computing device 106(1) in FIG. 1 may detect a user input at an input device 148. The user input may be sensed, for example, as a finger press on a user interface element displayed on a touchscreen, or as a click of a mouse on a user interface element selected by a pointer on the display 150. The client module 130 translates the user input according to a function associated with the selected user interface element. In some cases, the client module 130 may require the teleconference session 104 to perform a function. In this case, the client module 130 sends a control signal 156(1) to the server module 136 for service by the teleconference session 104.

In one example function, the user of the client computing device 106(1) may wish to cause a transition from a first mode of operation of the client computing device 106(1) to a second mode of operation, for the teleconference session 104. The user may click on the desired user interface element on the user's display 150. In response, the client module 130 sends the control signal 156(1) to the server module 136. The server module 136 would, in response to the control signal 156(1) perform the desired transition based on the teleconference data 146(1), data indicating locations of one or more of the other computing devices 106, and other suitable information.

The client computing device(s) 106(1) through 106(N) may use their respective profile modules 132 to generate participant profiles, and provide the participant profiles to other client computing devices and/or to the device(s) 110 of the system 102. A participant profile may include one or more of an identity of a participant (e.g., a name, user identity, a unique identifier ("ID"), etc.), participant data, such as personal data and location data may also be stored. Participant profiles may be utilized to register participants for teleconference sessions 104 and to indicate priority associated with a user identity and/or client computing device.

As shown in FIG. 1, the device(s) 110 of the system 102 includes a server module 136, a data store 138, and an output module 140. The server module 136 is configured to receive, from individual client computing devices 106(1) through 106(N), streams 142(1) through 142(M) (where M is a positive integer number equal to 2 or greater). In some scenarios, not all the client computing devices 106 utilized to participate in the teleconference session 104 provide an instance of streams 142, and thus, M (the number of instances submitted) may not be equal to N (the number of client computing devices). In some other scenarios, one or more of the client computing devices 106 may be communicating an additional stream or transmission of media data that includes content, such as a document or other similar type of media intended to be shared during the teleconference session 104.

The server module 136 is also configured to receive, generate, and communicate session data 144 and to store the session data 144 in the data store 138. The server module 136 is also configured to receive, interpret, and communicate position signals 145 and to store the position signals 145 in the data store 138. In various examples, the server module 136 may select aspects of the streams 142 that are to be shared with the client computing devices 106(1) through 106(N). The server module 136 may combine the streams 142 to generate teleconference data 146 defining aspects of the teleconference session 104. The teleconference data 146 can comprise select streams 142. The teleconference data 146 can define aspects of the teleconference session 104, such as a user interface arrangement of the user interfaces on the client computing devices 106, the type of data that is displayed, and other functions of the server and clients. The server module 136 may configure the teleconference data 146 for the individual client computing devices 106(1) through 106(N). Teleconference data 146 can include individual instances referenced to as 146(1) through 146(N). Furthermore, teleconference data 146 can include first teleconference data 142(1) for communication with a primary computing device, and second teleconference data 142(2) through 142(N) for communication with one or more secondary computing devices. The output module 140 may communicate the teleconference data instances 146(1) through 146(N) to the client computing devices 106(1) through 106(N). Specifically, in this example, the output module 140 communicates teleconference data 146(1) to client computing device 106(1), teleconference data 146(2) to client computing device 106(2), teleconference data 146(3) to client computing device 106(3), and teleconference data 146(N) to client computing device 106(N), respectively.

The teleconference data instances 146(1) through 146(N) may communicate audio that may include video representative of the contribution of each participant in the teleconference session 104. Each teleconference data instance 146(1) through 146(N) may also be configured in a manner that is unique to the needs of each participant user of the client computing devices 106(1) through 106(N). Each client computing device 106(1) through 106(N) may be associated with a teleconference session view. Examples of the use of teleconference session views to control the views for each participant at the client computing devices 106 are described with reference to FIG. 2.

Figure 2:
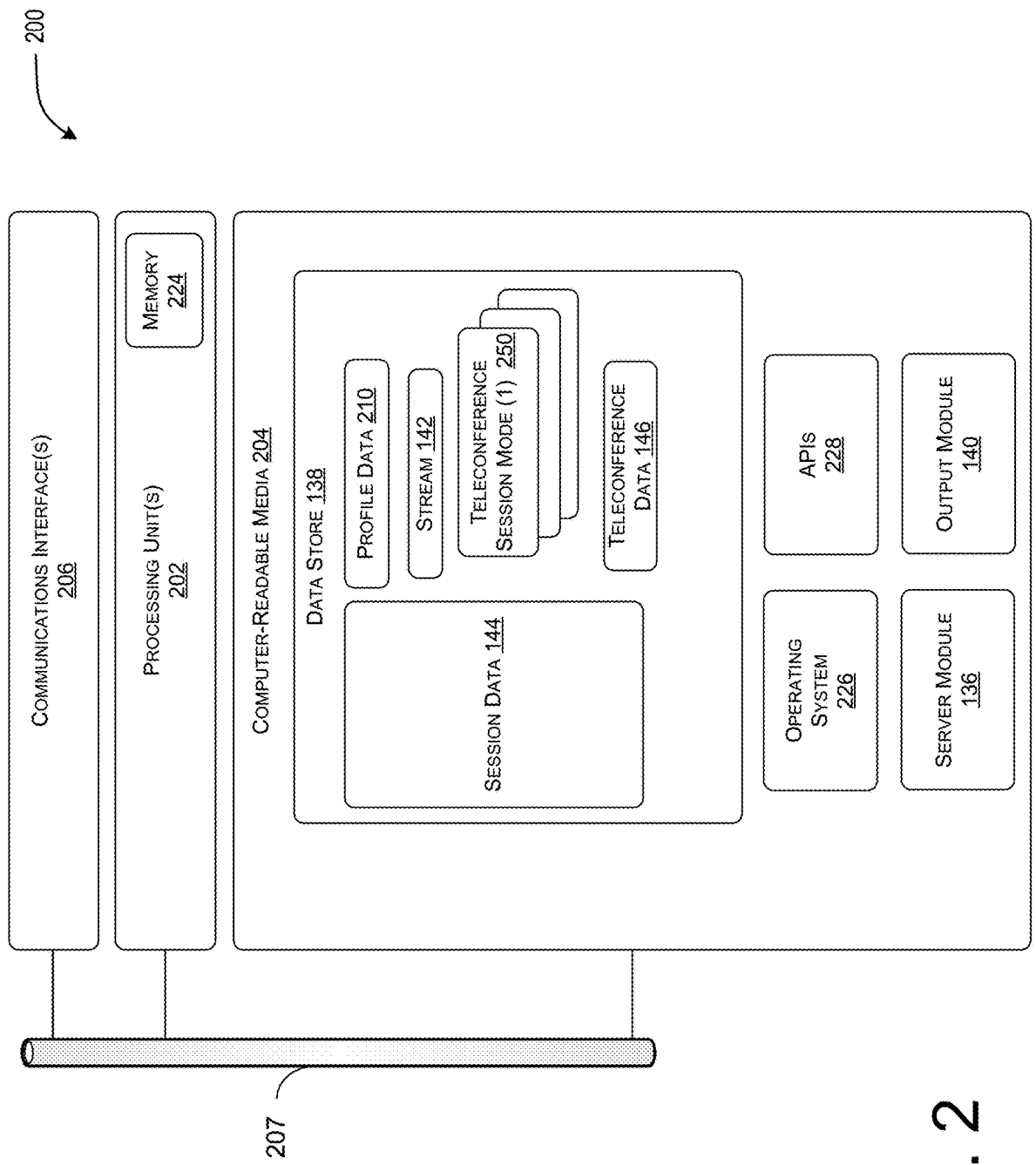
FIG. 2 is a diagram illustrating components of an example computing device configured to provide enhanced techniques for joining teleconference sessions.

In FIG. 2, a system block diagram is shown illustrating components of an example device 200 configured to provide the teleconference session 104 between the client computing devices, such as client computing devices 106(1) through 106(N) in accordance with an example implementation. The device 200 can be used to illustrate some components of one of the client computing devices 106. In addition, the device 200 may represent one of device(s) 110 where the device 200 includes one or more processing unit(s) 202, computer-readable media 204, and communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communications media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes the data store 138. In some examples, the data store 138 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or executed by processing unit(s) 202 and/or accelerator(s). For instance, in some examples, the data store 138 may store session data 144, profile data 210, and/or other data. The session data 208 may include a total number of users in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a user identity ("ID"), priority value, and other data.

In an example implementation, the data store 138 stores data related to the view each user experiences on the display of the user's client computing devices 106. As shown in FIG. 2, the data store 138 may include a teleconference session mode 250(1) through 250(N) corresponding to the operating mode of each client computing device 106(1) through 106(N) participating in the teleconference session 104. The teleconference session mode 250 may also be termed a "mode of operation" herein. Utilizing the teleconference session mode 250, the teleconference system 102 may support individual control over the view and mode each user experiences during the teleconference session 104. For example, as described in more detail below, the system 102 permits a user to participate with the user's client computing device 106 operating in one of several modes of operation, as described below.

The modes of operation can include, for example, a primary mode of operation and a secondary mode of operation. Other modes of operation including tertiary and auxiliary modes may also be applicable. Once a computing device 106 enters the teleconference session 104, different types of contextual user interfaces can be displayed on the display 150 for enabling users to access and share relevant information based on these modes of operation. For example, a secondary control menu can be displayed for enabling secondary users to readily select various types of media data to be shared by a computing device. Furthermore, a primary control menu can be displayed for enabling control of a state of the teleconference session 104. The combination of the control menus and the use of the modes of operation allow users to join the teleconference session 104 in a manner that reduces distractions while also allowing users to select and share the most relevant content. In general, a primary device can be selected by the teleconference system 102 to operate in the primary mode of operation. Additionally, one or more secondary devices can be selected by the teleconference system 102 to operate in the secondary mode of operation.

Several methods for selection of a primary device, and therefore establishment of the primary and secondary modes of operation, can be facilitated using the technologies described herein. For example, a primary device can be selected based on an order of the devices attempting to join the teleconference session 104. Thus, a first device to attempt to join can be selected as the primary device. In other aspects, the teleconference system 102 can analyze priority values associated with one or more computing devices to determine that the first computing device has a priority value superseding priority values of the remaining computing devices associated with the teleconference session 104.

In addition to establishing a primary device and primary and secondary modes of operation, the teleconference system 102 can also manipulate components of a subset of devices to enhance the teleconference session 104 and limit disruption. For example, the teleconference system 102 can remotely disable a camera component (e.g., input devices 148) of one or more client computing devices 106. Additionally, the teleconference system 102 can remotely disable an audio component (e.g., input device 148) of one or more client computing devices. Other manipulation of these components can also be possible, for example, through selective activation to allow certain participants to "take the stage" or share content.

As noted above, the data store 138 may store the profile data 210, streams 142, teleconference session modes 250, teleconference data 146, session data 144, and position signals 145. Alternately, some or all of the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 226 and application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the teleconference system 102 is configured to host the teleconference session 104 with the plurality of client computing devices 106(1) through 106(N). The teleconference system 102 includes one or more processing units 202 and a computer-readable media 204 having encoded thereon computer-executable instructions to cause the one or more processing units 202 to receive streams 142(1) through 142(M) at the system 102 from a plurality of client computing devices 106(1) through 106(N), select streams 142 based, at least in part, on the teleconference session mode 250 for each user, and communicate a teleconference data 146 according to the teleconference session modes 250 corresponding to the client computing devices 106(1) through 106(N). The teleconference data 146(1) through 146(N) are communicated from the system 102 to the plurality of client computing devices 106(1) through 106(N). The teleconference session modes 250(1) through 250(N) cause the plurality of client computing devices 106(1) through 106(N) to display views of the teleconference session 104 under user control. The computer-executable instructions also cause the one or more processing units 202 to determine that the teleconference session 104 is to transition client computing devices 106(1) through 106(N) to a different teleconference session mode 250 based on a user communicated control signal 156(1), also referred to herein as a control command 156, position signals 145, and other suitable information. In some configurations, the control command 156 comprises at least one of a user identity, a request to join a teleconference session 104, an access request, or other data described herein.

In some implementations, the techniques disclosed herein may utilize one or more predetermined modes of operation, also referred to as "modes," or "teleconference session modes." In an example of operation, the system 102 performs a method that includes receiving the streams 142(1) through 142(M) at the system 102 from a plurality of client computing devices 106(1) through 106(N), combining and formatting the streams 142 based, at least in part, on data indicating locations for each client computing device to form a teleconference data 146(1) through 146(N), and transmitting a teleconference data 146(1) through 146(N) to respective client computing devices.

As will be described below, the predetermined modes of operation can include a first mode of operation (referred to herein as a "primary") and a second mode of operation (referred to herein as a "secondary"). In some implementations, the primary and secondary modes of operation can be configured automatically through intelligent selection of a subset of client computing devices 106 (devices) that are co-located by the teleconference system 102. The predetermined modes of operation can also facilitate graphical elements providing control functionality ("control elements") for a teleconference session 104. For instance, a graphical element may be generated on the user interface enabling a user to provide content, end a session, mute one or more sounds, control other participant's streams, transition a particular device to a different mode of operation, etc.

In one illustrative example, the techniques disclosed below can utilize a primary mode of operation. The primary mode of operation may be a "fully functional" form of operation facilitating the anchoring of an immersive experience for one or more co-located computing devices. According to one aspect, only a single device of a group of co-located devices may be in the primary mode of operation. In the primary mode, an audio device such as a microphone may be enabled to receive audio information (e.g., sounds, voices, etc) from co-located users. Also in the primary mode, a video device such as a forward-facing camera may be enabled to receive video information (e.g., video recording) from co-located users. Accordingly, the primary mode of operation, and therefore a device operating in the primary mode of operation, may be fully functional and receiving multiple forms of audio/video input from one or more participants.

In another illustrative example, the techniques disclosed herein can utilize a secondary mode of operation. The secondary mode of operation may be a "lightweight" functioning form of operation facilitating the participation of other co-located devices while not detracting from the immersive experience provided by a primary device functioning in the primary mode of operation. According to one aspect, one or more co-located client computing devices may function in the secondary mode of operation. In the secondary mode, audio capture devices of the associated computing device may be disabled to mitigate audio feedback. Also in the secondary mode, a camera device, such as a forward-facing camera, may be enabled depending upon whether video information is being actively shared from the associated device. In this manner, duplicative video streams and audio streams can be avoided.

Generally, a selection of devices to operate in the primary and secondary modes of operation may be based on data indicating locations of a plurality of client computing devices 106. These client computing devices can be associated with a plurality of users desiring to join the teleconference session 104. For example, a group or subset of the client computing devices 106 may all attempt to join the teleconference session 104. Additionally, in one example, the data indicating the locations of the plurality of client computing devices can indicate, at least partially, general locations of the client computing devices 106.

In one illustrative example, the data indicating locations of the plurality of computing devices comprises position signals 145 such as social signals, audio signals, or positioning data. The data indicating locations of the plurality of computing devices can therefore include at least one of data defining a GPS position, data defining a Bluetooth signal strength, data defining a Wi-Fi triangulation, data defining an ultrasound watermarking, or data defining a characteristic of a near field communication signal. Additionally, the social signals can comprise social network signals, calendar signals, contact listing signals, and contact relationship signals. Such configurations can utilize any suitable technology for generating positioning data defining a location of a device. The positioning data can include, but is not limited to, data defining a GPS position, data defining a Bluetooth signal strength, data defining one or more Wi-Fi triangulations, data defining one or more ultrasound watermarkings, data defining an NFC-based position, etc.

Utilizing the received data, the teleconference system 102 can determine that a subset of computing devices of the plurality of computing devices are co-located based on the data indicating locations. In one illustrative example, the teleconference system 102 can interpret the data and implement a thresholding algorithm to identify one or more groupings of computing devices within a threshold distance of each other. Upon determining that a portion of one co-located grouping are attempting to join a single teleconference session, the teleconference system 102 may identify that portion as the subset of devices that are co-located.

Once the co-located subset is determined, the teleconference system 102 can select a first computing device of the subset of computing devices as a primary computing device for operating in the primary mode of operation. In general, the primary computing device can be used to anchor an immersive experience for the co-located devices and limit disruption caused by conventional teleconference systems.

Following this selection, the teleconference system 102 can generate teleconference data 146 associated with a teleconference session 104. In one illustrative example, the teleconference data 146 can include participant streams 142 having video of one or more participants and content streams 142 having video or images of files, data structures, word processing documents, and other shareable content.

Having generated the teleconference data 146, the teleconference system 102 may communicate first teleconference data 146(1) to the primary computing device, and communicate second teleconference data 146(2) through 146(N) to the remaining computing devices of the subset of computing devices. Accordingly, while the primary device is the only device receiving a first selection of teleconference data, the remaining devices all receive at least a sub-portion of the teleconference data. Thus, by efficiently generating the primary and secondary teleconference data having related but non-duplicative content, the teleconference system 102 of this illustrative example can overcome many technical drawbacks associated with conventional teleconference systems including wasted bandwidth, excessive use of computing resources of all client computing devices to process a first selection of teleconference data, and other drawbacks.

Hereinafter, a more detailed discussion of different scenarios involving an example teleconference session 104, various client computing devices 106, and teleconference data 146 is described in detail. It is understood that these example scenarios are not limiting of all uses of the described technologies.

Figure 3A:
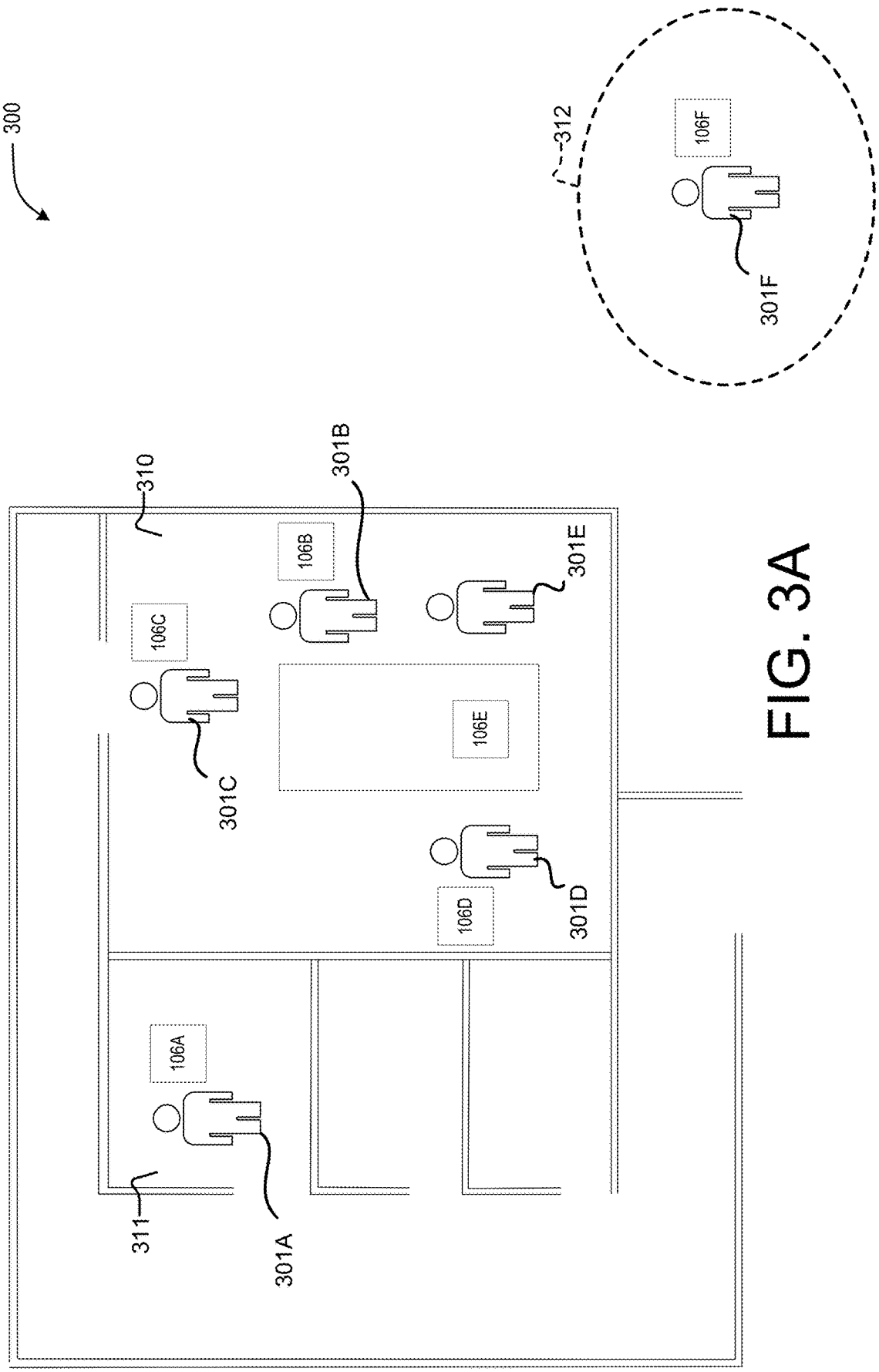
FIG. 3A illustrates several example scenarios where computing devices can be utilized to enable the techniques disclosed herein.
Figure 3B:
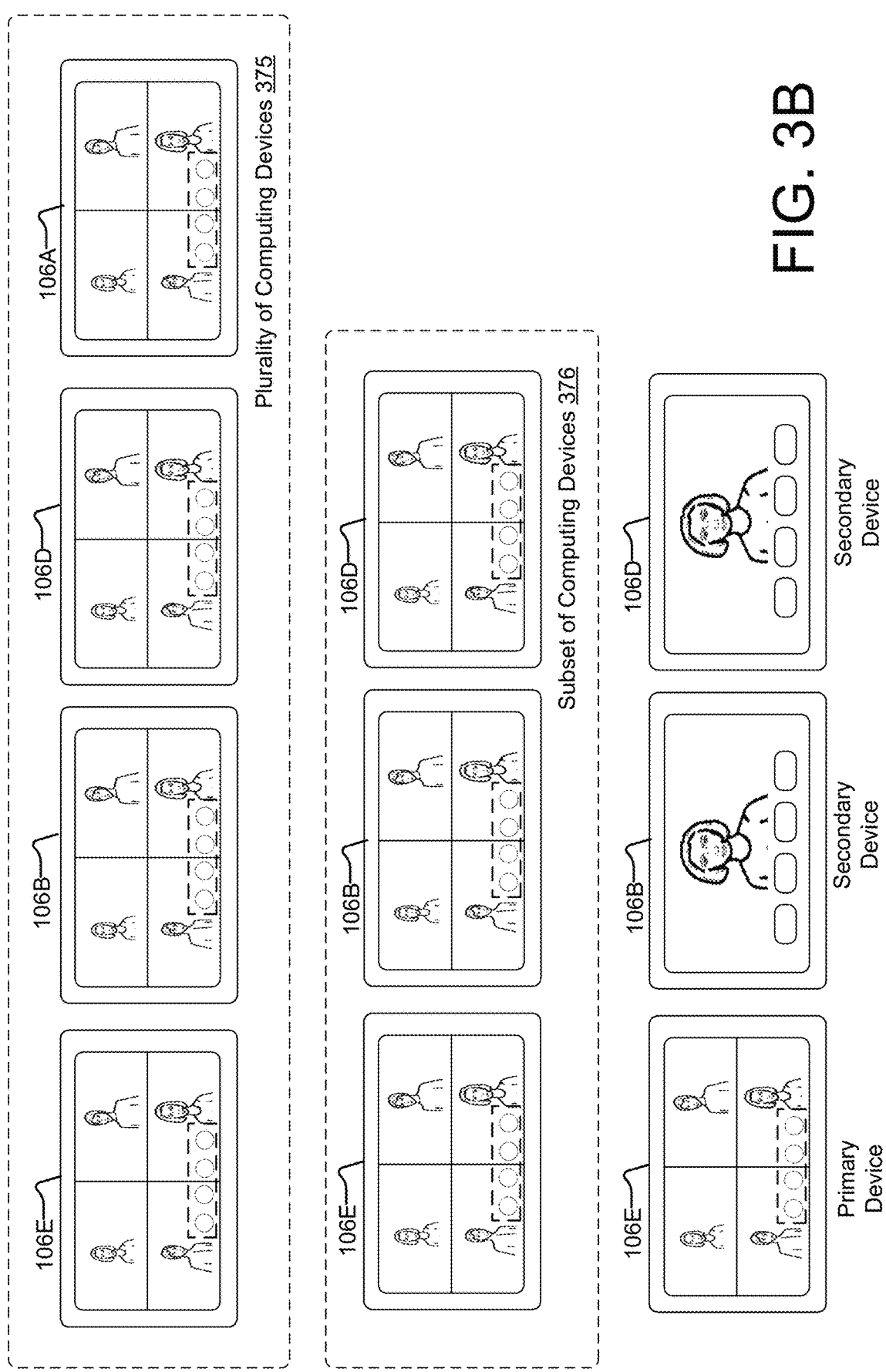
FIG. 3B illustrates several example screen shots from scenarios where computing devices can be utilized to enable the techniques disclosed herein.

FIGS. 3A-3B illustrate a number of scenarios where techniques of the present disclosure can be utilized. As shown, each user 301 is associated with one or more client computing devices 106. The following description describes scenarios where individual users 301 join a teleconference session 104. The following examples show scenarios where devices can start in primary mode or secondary mode. For illustrative purposes, an "in-room" join includes the activity of a device that is joining a session while the device is in the same room with other devices that are already connected in the teleconference session (e.g., the devices are co-located).

In a first scenario, the first user 301A is associated with a first computing device 106A and a first location 311, which is used to call into a teleconference session 104 that is already in communication with a fifth computing device 106E utilized by a fifth user 301E in a second location 310. Since the first user 301A is utilizing a single device, and since the single device is in a remote location from the fifth computing device 106E, the first computing device 106A can enter the teleconference session 104 in the primary mode of operation. Thus, the microphone and the speaker of the first computing device 106A are turned on while the first computing device 106A joins the teleconference session. Additionally, both of the first computing device 106A and the fifth computing device 106E may operate in the primary mode of operation. Moreover, both of the first computing device 106A and the fifth computing device 106E can receive first teleconference data 146(1), which includes a first selection of teleconference data.

In a second scenario, the second user 301B is utilizing a single device, the second computing device 106B, to join the teleconference session 104. As shown, the second user 301B is in the same location 310 as the fifth user 301E utilizing the fifth computing device 106E. By the use of the techniques disclosed herein, the teleconference system 102 determines that the second computing device 106B is co-located with another device already in the primary mode of operation, e.g., the fifth computing device 106E.

A number of technologies can be utilized to determine if two or more devices are co-located. In one illustrative example, one or more devices are in proximity to one another when there is a conflict with an audio signal. For example, the second computing device 106B can utilize a microphone and/or a speaker to determine if the fifth computing device 106E can cause audio interference, e.g., feedback, and vice versa. The second computing device 106B and/or the fifth computing device 106E can analyze audio signals communicated by each device. One or more suitable technologies can be used to determine if the audio signals communicated by each device can cause a conflict, e.g., audio feedback or other types of interference.

In another example, devices can determine if they are in proximity to one another if they are within a threshold distance of one another. The distance between two different devices can be measured by the utilization of one or more positioning technologies, such as GPS, Wi-Fi, or other suitable technologies. Other technologies that can be used with the present disclosure can rely on a Bluetooth signal strength, Wi-Fi triangulation, ultrasound watermarking, NFC, or other suitable technologies. The distance between two different devices can be determined by an analysis of positioning data defining a position of a device. The positioning data can include, but is not limited to, data defining a GPS position, data defining a Bluetooth signal strength, data defining one or more Wi-Fi triangulations, data defining ultrasound watermarkings, data defining an NFC-based position, etc. When a client computing device 106 determines that it is within a predetermined distance of another device connected to the same teleconference session 104, one of the client computing devices 106 can generate data indicating a conflict. Audio signals and social signals can also be utilized to determine if two or more devices are in proximity to one another.

When a conflict is detected, the second computing device 106B configures itself to request to join the teleconference session 104 in the secondary mode of operation. For example, the second computing device 106B may mute its microphone and/or turn off its speaker. Such a disablement of the audio components can occur before the second computing device 106B connects with the teleconference session 104. In addition, the microphone or speaker of a device can be controlled by the client device itself or a server computer, such as the device 110. Furthermore, although described as being detected by respective computing devices 106, the teleconference system 102 can also determine if two or more devices are co-located utilizing similar techniques as described above. Thus, the teleconference system 102 can also remotely disable audio and/or video from user computing devices 106, as well.

In a third scenario, the first user 301A is utilizing the first computing device 106A to join the teleconference session 104, the second user 301B is utilizing the second computing device 106B to join the teleconference session 104, a fourth user 301D is utilizing a fourth computing device 106D to join the teleconference session 104, and the fifth user 301E is utilizing the fifth computing device 106E to join the teleconference session 104. As shown in FIG. 3B, of the plurality of devices 375 joining the teleconference session 104, the teleconference system 102 can determine a subset of computing devices 376 from the plurality of devices 375. The teleconference system 102 can also determine a primary computing device, in this example 106E, from the subset of computing devices 376 as well as one or more secondary computing devices 106B-106D from the subset of computing devices 376.

As summarized above, one or more signals, such as social signals, audio signals, and/or positioning data can be utilized to determine if one or more devices are in proximity to one another, e.g., co-located. When it is determined that the devices are within a predetermined distance or are co-located, the devices are determined to be part of the subset of computing devices 376. Examples of social signals include data from one or more resources, such as a social network, calendar database, email system, or other resource indicating that one or more devices are co-located. Such data can be supplemented with audio signals indicating microphone and speaker interference. In addition, social signals and audio signals can be supplemented by positioning data. Any combination of the data and signals can be utilized to determine when one or more devices are part of the subset of computing devices 376.

As described herein, the primary device can be selected based on one or more factors. For example, the fifth computing device 106E can become the primary device if it is the first computing device to enter the teleconference session 104. The fifth computing device 106E can also be selected as the primary device based on any suitable data, such as a priority level, user preference, or a user input. The fifth computing device 106E can also be selected as the primary device based on the device type. For example, if the fifth computing device 106E is a laptop and the remaining devices are mobile phones, the fifth computing device 106E may be selected as the primary device based on the device type of the fifth computing device 106E having possibly increased capabilities as compared to the remaining devices. Other considerations in selecting primary devices may also be applicable.

Upon selecting the fifth computing device 106E as the primary device, the teleconference system 102 can also select the second computing device 106B and the fourth computing device 106D as secondary devices, as illustrated in FIG. 3B. As further shown, each of the primary and secondary devices are configured to correspondingly operate in the primary or secondary modes of operation.

Continuing this scenario, the techniques described herein also allow for the promotion of secondary devices to primary devices based on a variety of circumstances. For example, if the second user 301B leaves the second location 310 while connected to the teleconference session 104, the second computing device 106B can be promoted to the primary mode of operation. According to one aspect, the second user 301B may request to promote the second computing device 106B to the primary mode of operation. According to another aspect, the teleconference system 102 can determine that the device 106B is no longer a part of the subset 376 and notify the second user 301B to decide if the second computing device 106B should be promoted to the primary mode of operation. According to yet another aspect, the teleconference system 102 can also determine that the second computing device 106B is no longer co-located with the subset of devices 376 in the second location 310 and automatically promote the second computing device 106B to the primary mode of operation. In this manner, the teleconference system 102 can directly or indirectly facilitate promotion of computing devices from the secondary mode of operation to the primary mode of operation.

As a further example, if the first user 301A enters the second location 310, the techniques described herein can further facilitate limitations in disruption of the users co-located in the second location 310. For example, the teleconference system 102 can detect the first computing device 106A being in proximity to or within a threshold distance of the subset of devices 376. If this occurs, the teleconference system 102 can demote the first computing device 106A from the primary mode of operation to the secondary mode of operation. In accordance with one aspect, the teleconference system 102 can disable an audio component of the first computing device 106A to limit audio interference, and/or communicate the second teleconference data 146(2) to the first computing device 106A. Under these circumstances, the first user 106A can be prompted or notified that another primary device is part of the subset of devices 376 to allow the first user 301A to interact with the first computing device 106A and decide to receive the second teleconference data 146(2) as a secondary device. Alternatively, the teleconference system 102 can immediately demote the first computing device 106A to avoid disruption.

The techniques described herein may also apply to users joining from remote locations. As shown in FIG. 3A, a sixth user 301F is utilizing a sixth device 106F to join the teleconference session 104. In this example, the sixth user 301F is at a remote location 312, separate from the second location 310. When the sixth user 301F utilizes the sixth device 106F to join the teleconference session 104, the sixth device 106F may join the teleconference session 104 in the primary mode such that the sixth user 301F participates in a fully immersive experience. Alternatively, the sixth user 301F may also select or request to join in secondary mode, or request to downgrade or demote the sixth device 106F into the secondary mode of operation.

Figure 4A:
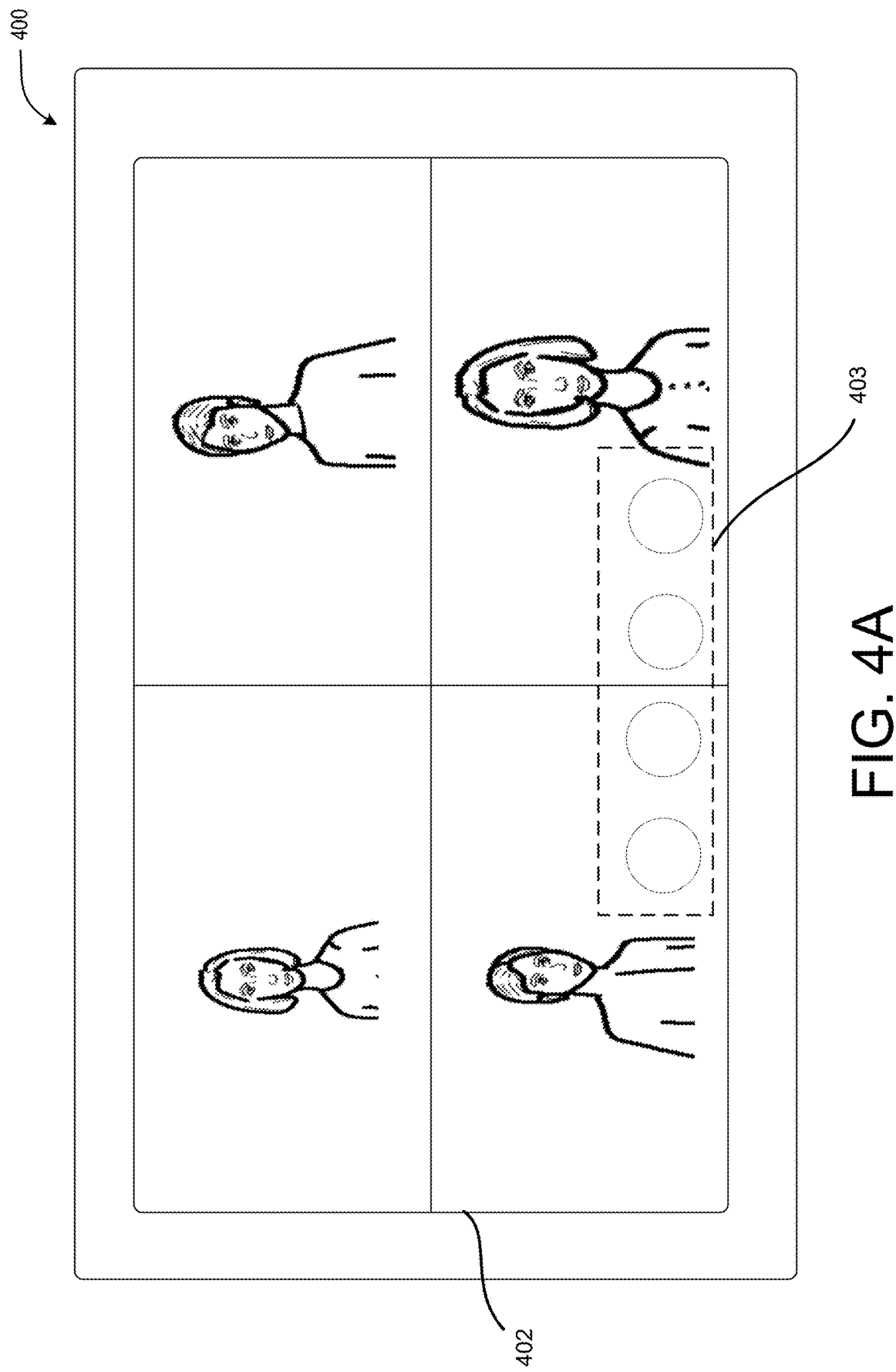
FIG. 4A illustrates an example user interface of a primary computing device including a primary portion which provides a stage for the teleconference session.
Figure 4B:
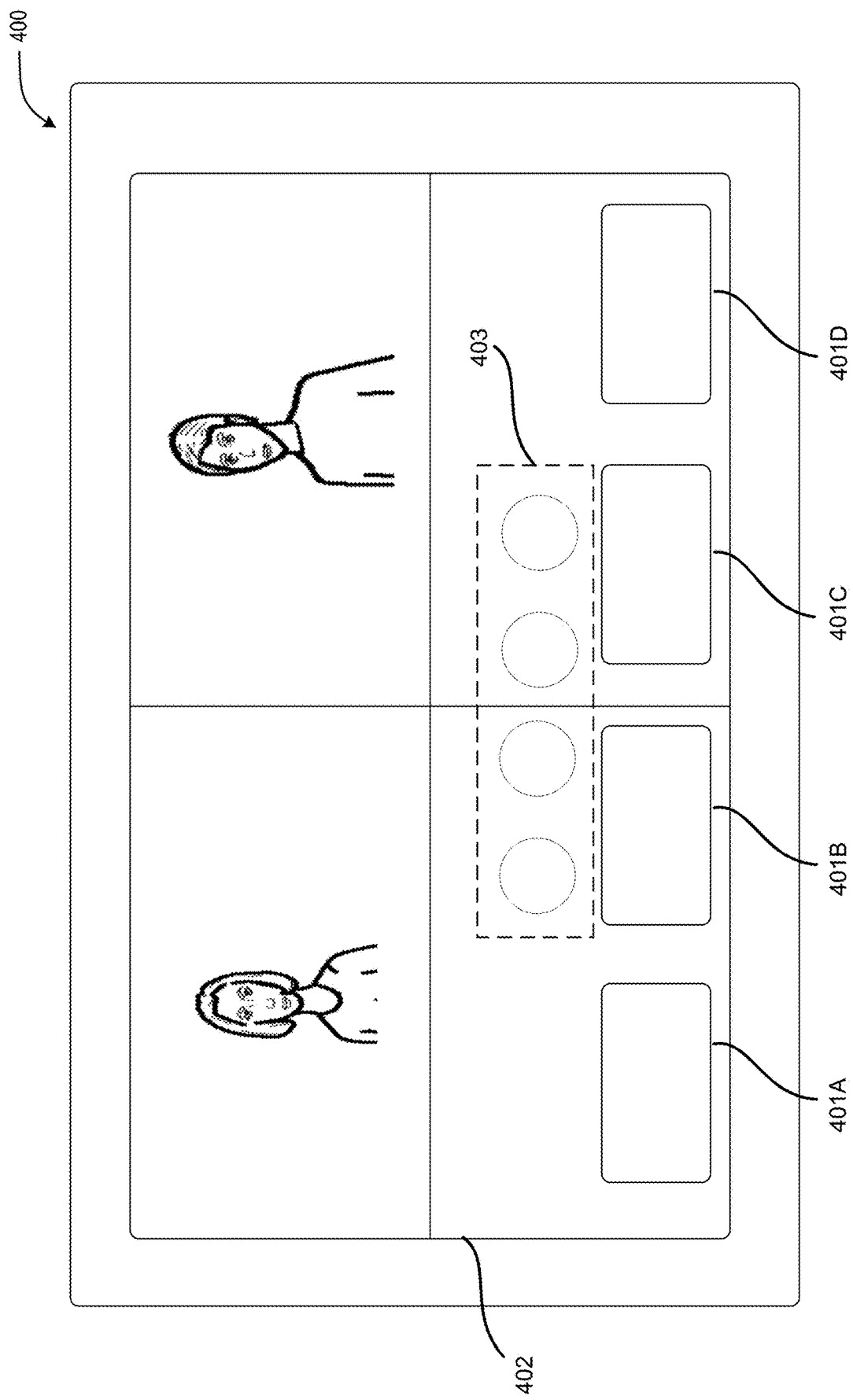
FIG. 4B illustrates an example user interface of a primary computing device including several selectable elements for providing access to various types of media.
Figure 4C:
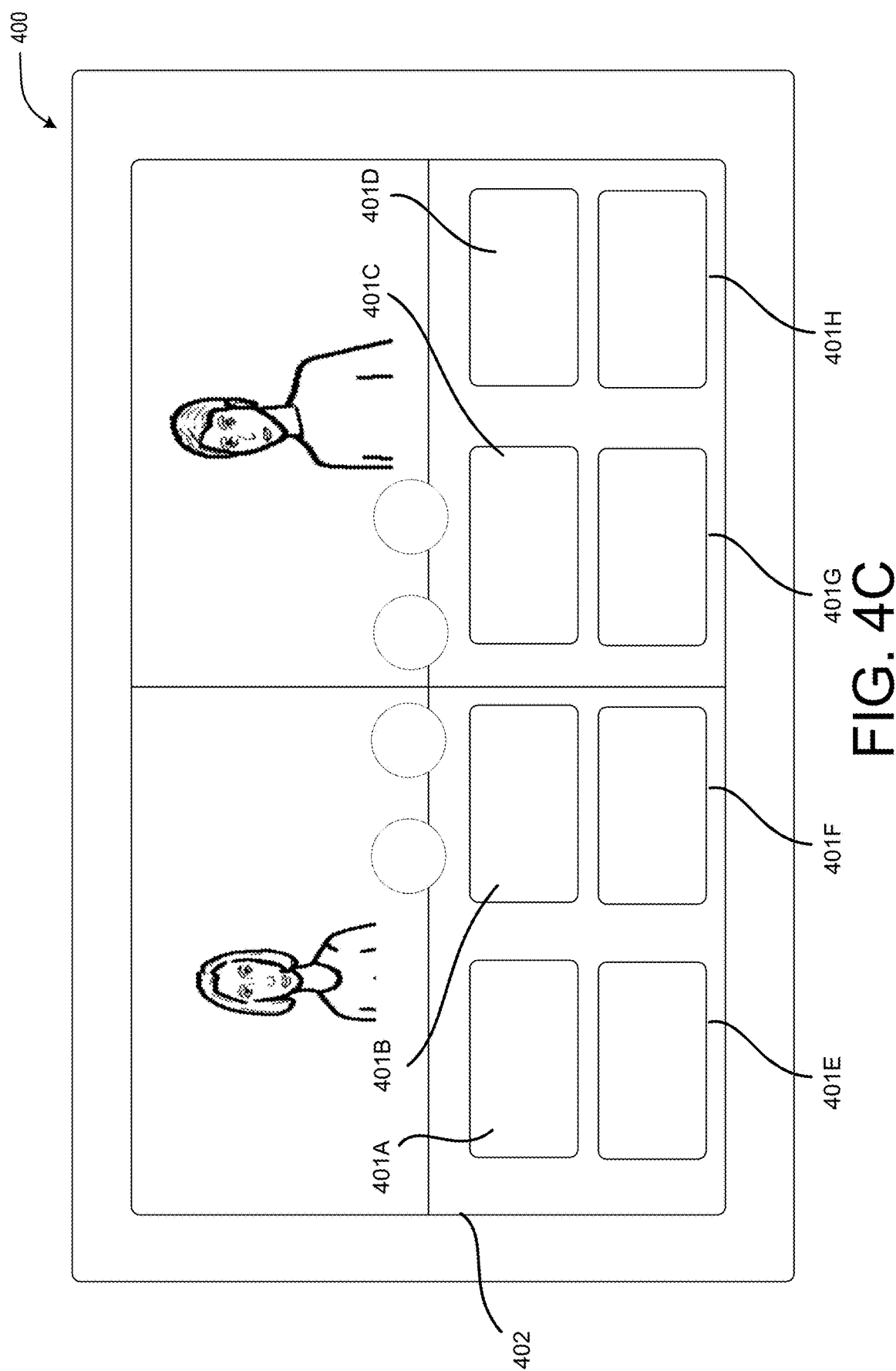
FIG. 4C illustrates an example user interface including selectable elements that are expanded from the display shown in FIG. 4B.

As summarized above, the techniques disclosed herein provide different modes of operation for teleconference sessions. Additionally, user interfaces and user interface arrangements for enabling users to access and share relevant information based on the primary and secondary modes of operation can be provided to further enhance the teleconference system 102. Several examples of such user interfaces are shown in FIGS. 4A-4C, 5A-5B, and 6A-6E. Specifically, FIGS. 4A-4C illustrate aspects of a first user interface 400 that can be displayed on a device 106 in communication with a teleconference session 104. This example user interface 400 can be displayed on a device 106, such as a desktop computer, that is operating in the primary mode of operation.

As shown in FIG. 4A, the first user interface 400 includes a primary portion 402 which provides a stage for the teleconference session 104. Selected media data, such as streaming videos, files, and applications, shared in the teleconference session 104 can be displayed in the primary portion 402 of the user interface. As illustrated, the primary portion 402 can display a variety of participant streams and/or content streams from the teleconference session 104. Accordingly, the primary portion 402 displays a rendering of the first teleconference data 146(1) described above. The first teleconference data 146(1) can generally include a first selection of teleconference data as compared to a reduced or lightweight sub-portion of data being communicated to secondary devices.

The first user interface 400 can also comprise a number of core teleconference control elements 403, which can be configured to control aspects of the teleconference session 104. Generally, the core teleconference control elements 403 are configured to control a state of the teleconference session. For instance, a first button of the core teleconference control elements 403 can disconnect a device 106 from the teleconference session 104. A second button of the core teleconference control elements 403 can control the microphone of the device 106, i.e., a mute button. A third button of the core teleconference control elements 403 can control the camera of the device 106, i.e., toggle the camera on or off. A fourth button or any positioned control element can also involve a transfer function. In response to receiving the user actuation of the fourth button, the primary device may transition to become a secondary device. In some configurations, the display of the core teleconference control elements 403 can fade over a predetermined period of time. In such configurations, the core teleconference control elements 403 can be redisplayed based on one or more actions, such as a hover or another suitable user interaction within a predetermined portion of the user interface 400.

When a device 106 connects to a teleconference session as a primary device, e.g., while being a single device or a primary device amongst co-located devices, a menu having an arrangement of selectable elements providing access to various types of media can be displayed. The media can include, but is not limited to a desktop share, an application share, or a file share. FIG. 4B illustrates an example of several selectable elements 401 for providing access to various types of media. For instance, the first selectable element 401A can provide access to a particular file. The second selectable element 401B can provide access to a desktop share, the third selectable element 401C can provide access to an application share, and the fourth selectable element 401D can provide access to another file. These examples are provided for illustrative purposes and are not to be construed as limiting. It can be appreciated that the selectable elements 401 can provide access to any suitable type of shareable media, and the selectable elements 401 can be arranged in any suitable order. A specific view of content activity from the shared app could also be the shared target, like a tab or a whiteboard.

The user interface 400 can be configured to allow the user to scroll through additional selectable elements 401 by swiping or scrolling the selectable elements 401 to the left or to the right. In addition, the display of the selectable elements 401 can be expanded when a user provides a gesture, such as an upward swipe. FIG. 4C illustrates one example where the display of selectable elements 401 are expanded from the display shown in FIG. 4B. Thus, there are various user interface arrangements for primary devices allowing for fully immersive control of a teleconference session.

In some configurations, the control menu can involve a ranked list of different types of media data. Going beyond typical menus, which only show a fixed list of sharing options, the present techniques can prioritize and rank individual sources of media data to provide the most relevant sharing options for a team. For illustrative purposes, a team may be defined by the participants of a session or a team may be a predetermined selection of participants. Thus, based on a team's user activity, various types of media data, such as an application share, a desktop share, a file share, a video share, and/or other types of media data can be ranked and displayed on a control menu to enable the users to readily access, select, and share the most relevant or most recent content for a team.

To enable aspects of the present disclosure, the client module 130 can generate data indicating an interest level or a "sharing interest indicator" for each source of media data that can be shared by a client computing device 106. For example, a desktop share can have a first interest level, and a file share can have a second interest level. The interest level can then be used to arrange the selectable elements 401 of the different sources. In some configurations, the menu can arrange the selectable elements 401 according to the interest level, optionally, with the highest interest level selectable element 401 on the left. Another selectable element can be added to cause a display of a local or network search, local search, online search, shared content bin search, or other resources of desired content. The grid example shows how rich content can populate the overlay or push tray menu. But a list item view or combination list and rich item view is also possible in the menu configuration.

The interest level associated with each selectable element 401 can be based on a number of factors. For instance, interest may be based on a timestamp indicating when a file or other content was last updated. Interest may also be based on whether a source of media data was recently used. For example, if the desktop share was used more recently than a particular file, the desktop share may have a higher interest level than the file. In some configurations, an interest level for a particular source of media data can be based on an overall interaction level a team has with the source. For instance, if a team has a high level of interaction with an application, that application may have a higher interest level than a file or other content that does not have as much interaction, e.g., an amount of data associated with a team's interaction, an amount of time a team interacts with a source, etc. A team's interaction with a particular resource can apply to applications, files, channels of communication, websites, a shared desktop, or any other content and/or source. The techniques disclosed herein can also surface recommended content depending on the depth of cross reference on related activity from each of the individual or total group of participants.

Figure 5A:
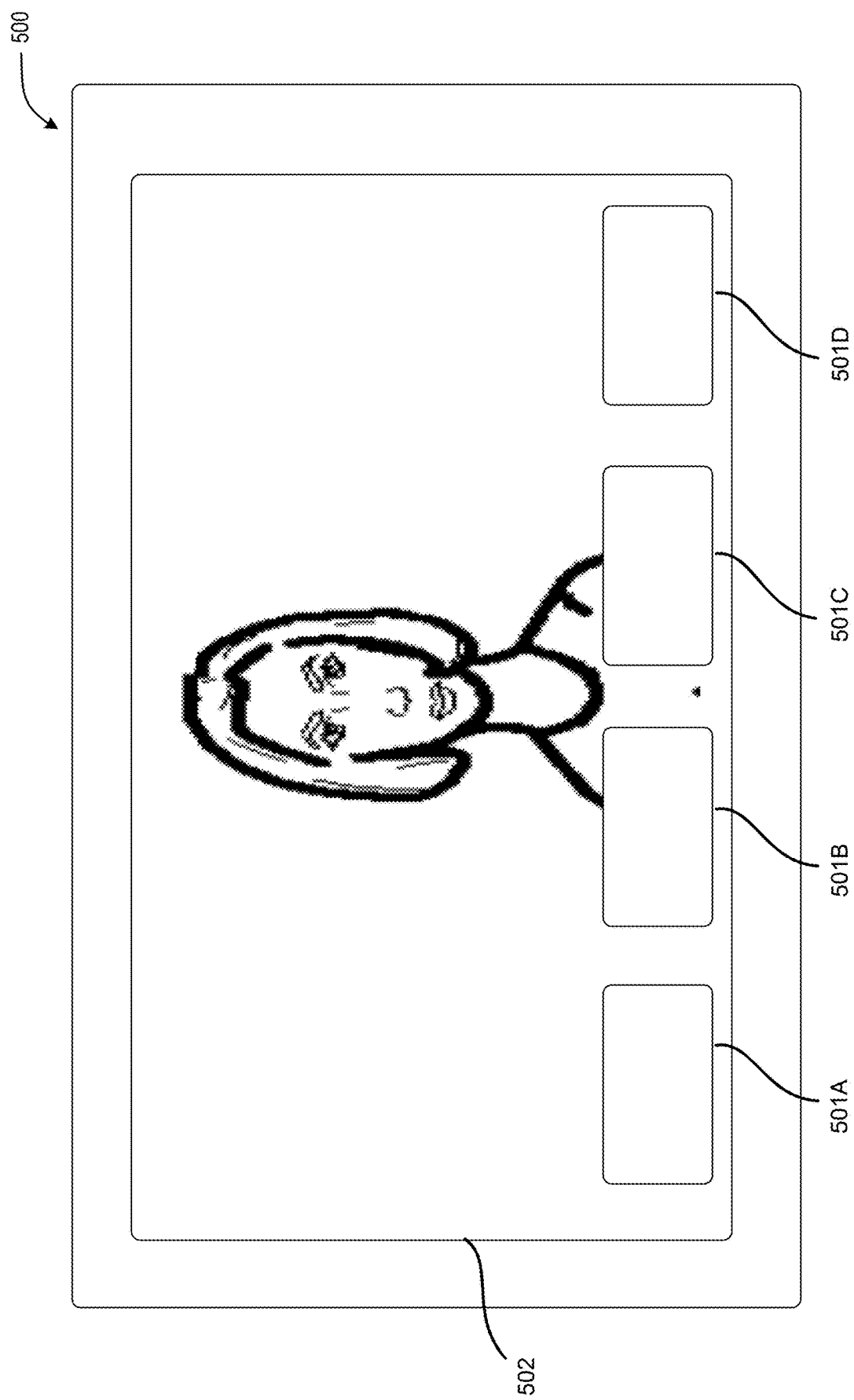
FIG. 5A illustrates an example user interface of a secondary computing device.
Figure 5B:
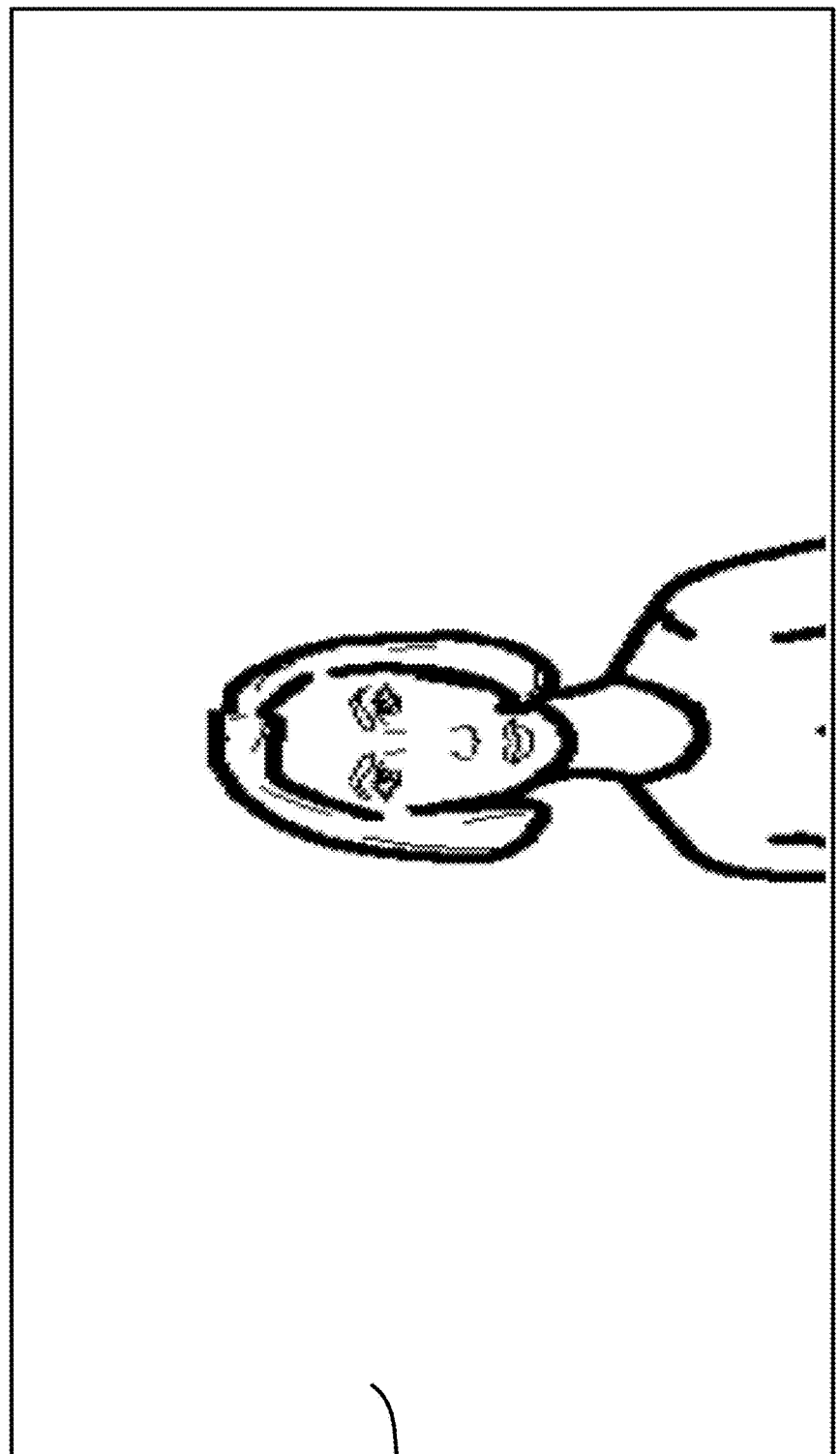
FIG. 5B illustrates an example user interface of a secondary computing device.

Turning now to FIGS. 5A-5B, several graphical user interfaces associated with secondary devices in the secondary mode of operation are described in detail. FIG. 5A shows aspects of a second user interface 500 for a secondary device. Generally, the user interface 500 includes a reduced user interface configured to display the sub-portion of teleconference data 146 based at least in part on an activity level. The example of FIG. 5A shows a control menu having the sharing control elements 501 for displaying options for sharing media and/or options for promoting a secondary device to a primary device. Furthermore, the interface 500 includes a session stage 502 somewhat similar to the session stage 402 described above.

For instance, a first control 501A is configured to activate a camera device. In response to receiving a user actuation of the first contro 1501A, the camera of the device is activated and a live video feed from the camera may be presented "on stage" (e.g., if allowed by a primary device), and a rendering of the live feed is displayed on other devices in communication with the teleconference session 104. The second control 501B is configured to activate file sharing and application sharing functionality. In response to receiving a user actuation of the second control 501B the secondary device enables a user to select an application or a file to be shared with the teleconference session 104. Once a file or an application is selected, a rendering of the selected media can be presented "on stage," e.g., a rendering of the selected media is communicated to devices in communication with the teleconference session 104.

The third control 501C is configured to activate a transfer function. In response to receiving a user actuation of the third control 501C, the secondary device may become a primary device based on considerations of the teleconference system 102. For example, if a device 106 is initially co-located with other devices, the user actuation of the third control 501C is received, and the device is no longer co-located with another device in the primary mode, the teleconference system 102 may enable the device to switch to the primary mode of operation to retain the immersive experience for the user. The transfer to the primary mode may be governed based upon the position signals described in detail above and/or a thresholding algorithm to ensure audio interference is mitigated. Other implementations including a timer-based approach can also be facilitated through waiting a predetermined or desired amount of time prior to activating the primary mode at the device. Even further, the teleconference system 102 may immediately allow the device to enter the primary mode of operation with an additional interface element (not shown for clarity) overlaying the user interface 500 alerting the user to activate audio and video devices once no longer co-located. Thus, several implementations of a swap from secondary mode to primary mode can be facilitated by the techniques described herein.

The fourth control 501D provides a connection control to the teleconference session 104, e.g., the fourth control 501D can be a "hang up" or disconnect button. These examples are provided for illustrative purposes and are not to be construed as limiting. It can be appreciated that other controls can be displayed providing additional functionality to a secondary device.

As shown, the interface 500 does not have core teleconference control elements for controlling a microphone or other forms of audio communication as the secondary device is not configured to communicate audio signals in some implementations. The contextual menu controls, features, searchable content, recent or contextual content can be the open state of many differing conversation and collaboration core control needs such as: sharing, recording, remote control, pstn/voip calling, sensor detection, device detection/selection, etc. The layout configuration of the control menu can adapt to differing screen layouts as well: top, bottom, side, etc. Actionability can be influenced by differing gestures as well: swipe up, down, left, right, and tap, double tap, tap and hold, etc.

In some configurations, during an in-room join while co-located with other devices, a device can select different types of media data for display. For instance, in the above-described example when the second computing device 106B joins a teleconference session 104 while in the second location 310 with other devices, such as the fifth computing device 106E, the second computing device 106B can display received teleconference data that is based on an activity level. In one illustrative example, as shown in the example of FIG. 5B, if a main view of a primary device is displaying a participant stream, the participant stream may be displayed on secondary devices on the main portion 502 of the user interface 500. It follows that as different content streams or participant streams are displayed on a primary device, only a subset of teleconference data is communicated to the secondary devices. Accordingly, reduced bandwidth usage is realized while also allowing a fully immersive teleconference experience.

Turning now to FIG. 6A, aspects of another user interface, interface 600, used for a device 106 operating in a secondary mode of operation are described. In this particular example, it is understood that the particular interface 600 is an illustrative example representing a user interface on a mobile device, such as a tablet computer, mobile phone, or other similar device. It can be appreciated that similar aspects of the interface 600 as compared to the interface 500 exist. Accordingly, exhaustive description of similar elements is omitted herein for the sake of brevity.

As shown, the user interface 600 can comprise a control menu having sharing control elements 651 for providing access to various types of media. The sharing control elements 651 can be arranged to function similar to the sharing control elements 501 described in detail above. For instance, the first selectable element 651A can provide access to a particular file. The second selectable element 651B can provide access to a desktop share, and the third selectable element 651C can provide access to an application share. These examples are provided for illustrative purposes and are not to be construed as limiting. It can be appreciated that the selectable elements 651 can provide access to any suitable type of shareable media and are arranged similarly to the selectable elements 501.

Figure 6B:
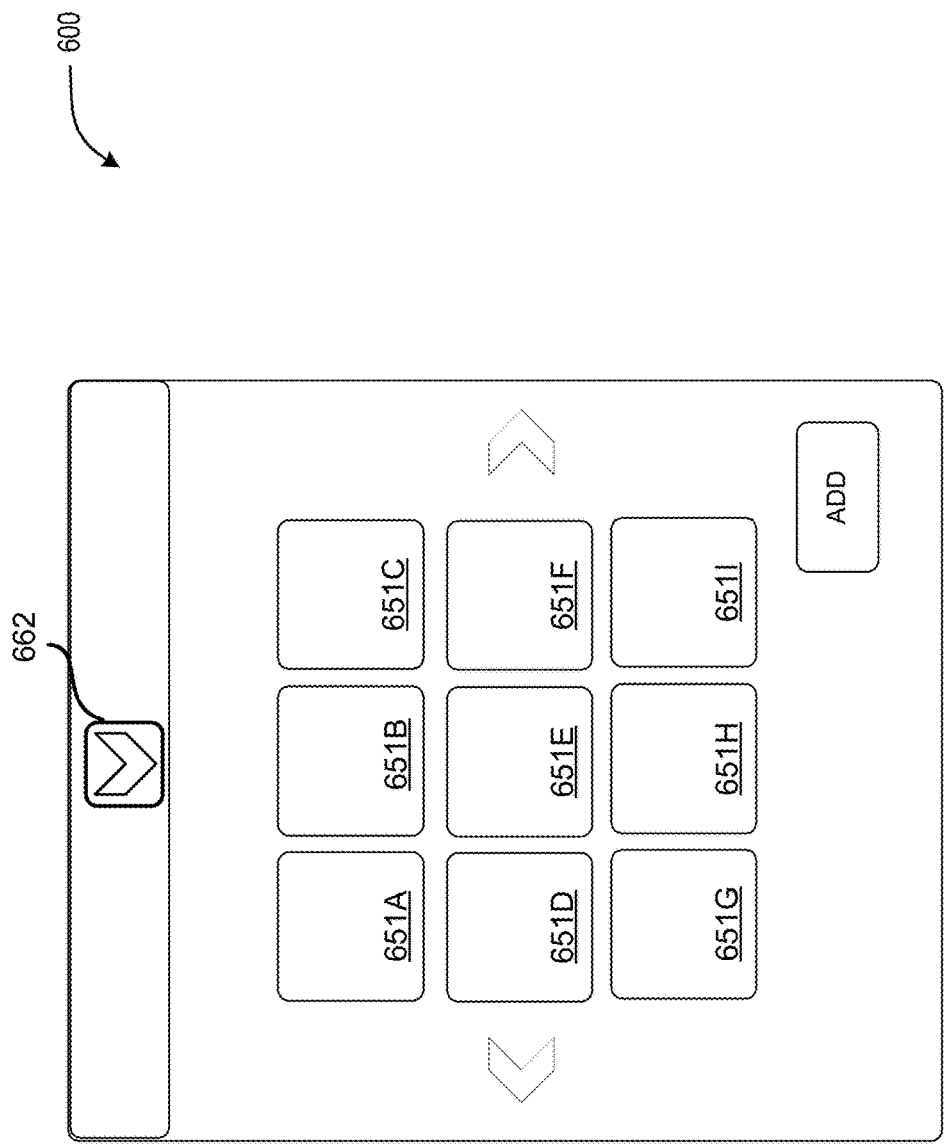
FIG. 6B illustrates an example user interface arrangement of a computing device operating in a secondary mode of operation.

As shown in FIG. 6A, the interface 600 can also include a display of the session stage 602, which is a video presentation of the second teleconference data or sub-portion of teleconference data communicated to the client devices. The display of the session stage 602 can show a salient feature of the session, such as the most dominate speaker or shared content. Upon a user actuation of a graphical element, such as the chevron displayed in the bottom center of the interface, the display of the session stage 602 can expand to show additional sharing options available to secondary devices. For example, as shown in FIG. 6B and FIG. 6C, examples of full swipe configurations of a user interface 600 of a mobile device operating in the secondary mode are provided.

As shown in FIG. 6B, the user interface 600 can comprise a control menu having sharing control elements 651A-651I for providing access to various types of media. For instance, the selectable elements 651A-651I can provide access to a particular file, a desktop share, and an application. These examples are provided for illustrative purposes and are not to be construed as limiting. It can be appreciated that the selectable elements 651A-651I can provide access to any suitable type of shareable media. It can also be appreciated that the interface 600 can have any suitable number of selectable elements 651. In addition, a user can scroll through additional selectable elements 651A-651I by actuating the arrows to view additional selectable elements 651. The user interface 600 can also include an "ADD" button for enabling users to add content, e.g., files, applications and other content, to the menu. Displayed controls and content can scale in rows and column behaviors to adapt to differing size devices, windows, user needs, etc.

The user interface 600 can also provide access to a display of the session stage by the use of a gesture, such as a down swipe applied to the first UI element 662. When a predetermined gesture is received, e.g., a down swipe is applied to the first UI element 662, the user interface 600 transitions to the example user interface 600 shown in FIG. 6C, which includes a video presentation of the second teleconference data 146(2) that is presented on the session stage 602. While in this mode, other share controls 664, e.g., a send button or a share button, can be positioned in the user interface 600. The user interface 600 can be configured with or without the share controls. The user interface 600 shown in FIG. 6C can transition back to the user interface 600 shown in FIG. 6B in response to receiving a predetermined input gesture, such as an up swipe at the second UI element 663.

Figure 6D:
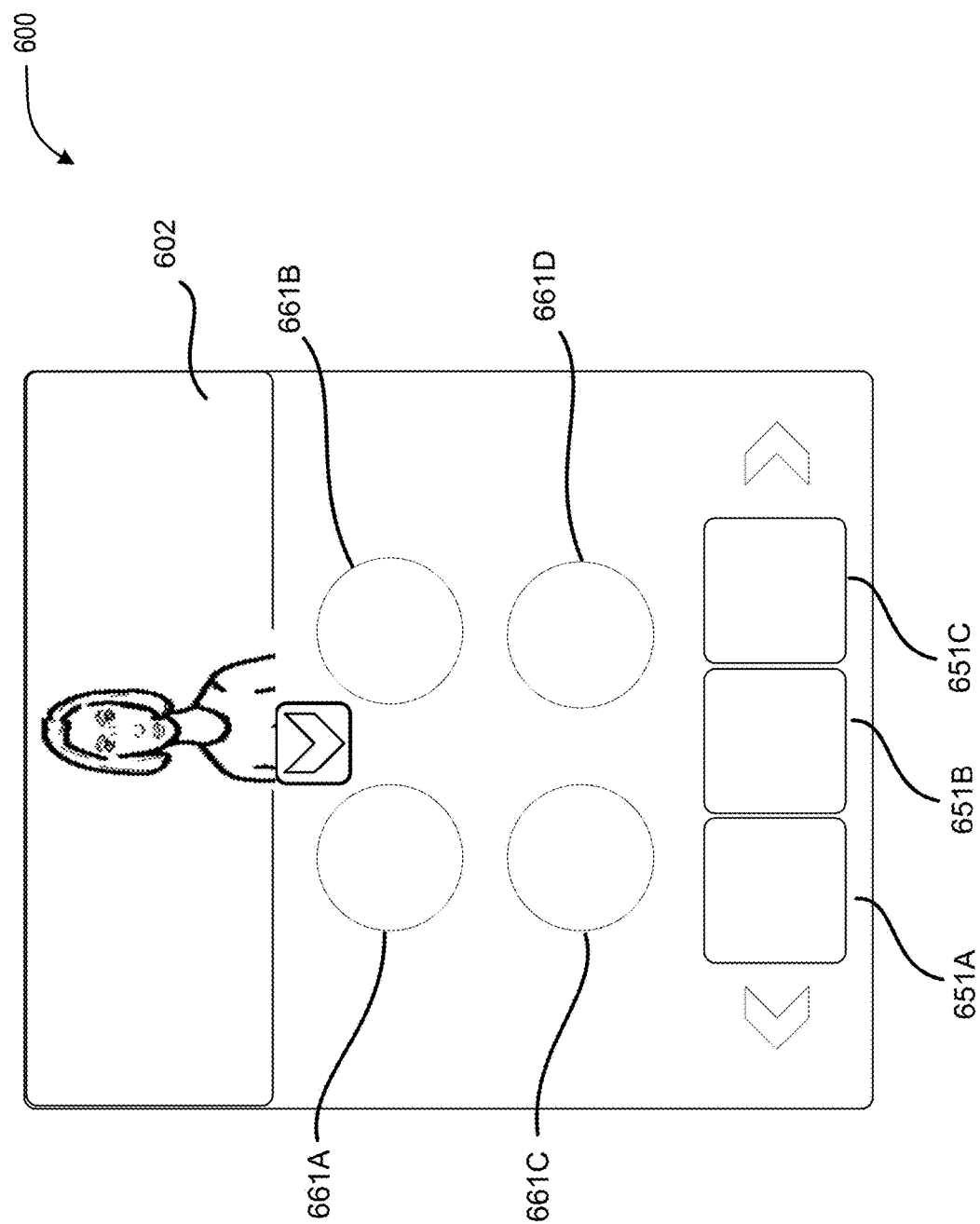
FIG. 6D illustrates an example user interface arrangement of a computing device having core teleconference control elements.
Figure 6E:
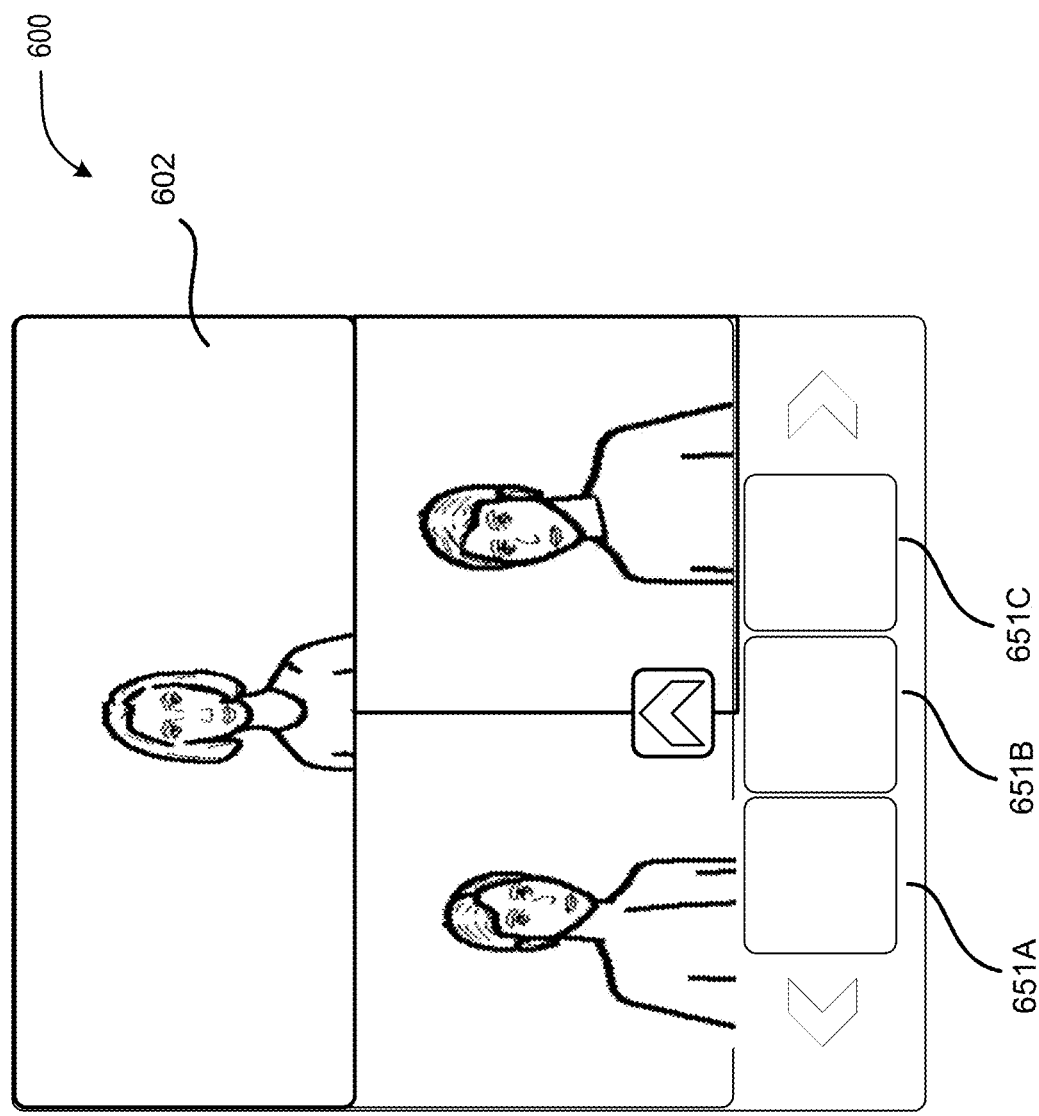
FIG. 6E illustrates an example user interface arrangement having core teleconference control elements.

It should be understood that mobile devices can also be promoted from the secondary mode of operation to the primary mode of operation. For example, as illustrated in FIGS. 6D and 6E, a user interface having core teleconference control elements 661 and receiving the first teleconference data can also be facilitated. The core teleconference control elements 661 may be arranged to function similar to the core teleconference control elements 403. Accordingly, while some examples above have been described in the context of a laptop or desktop computer being a primary device, the same may be inclusive of mobile devices with user interfaces arranged similar to FIGS. 6D and 6E.

Figure 7A:
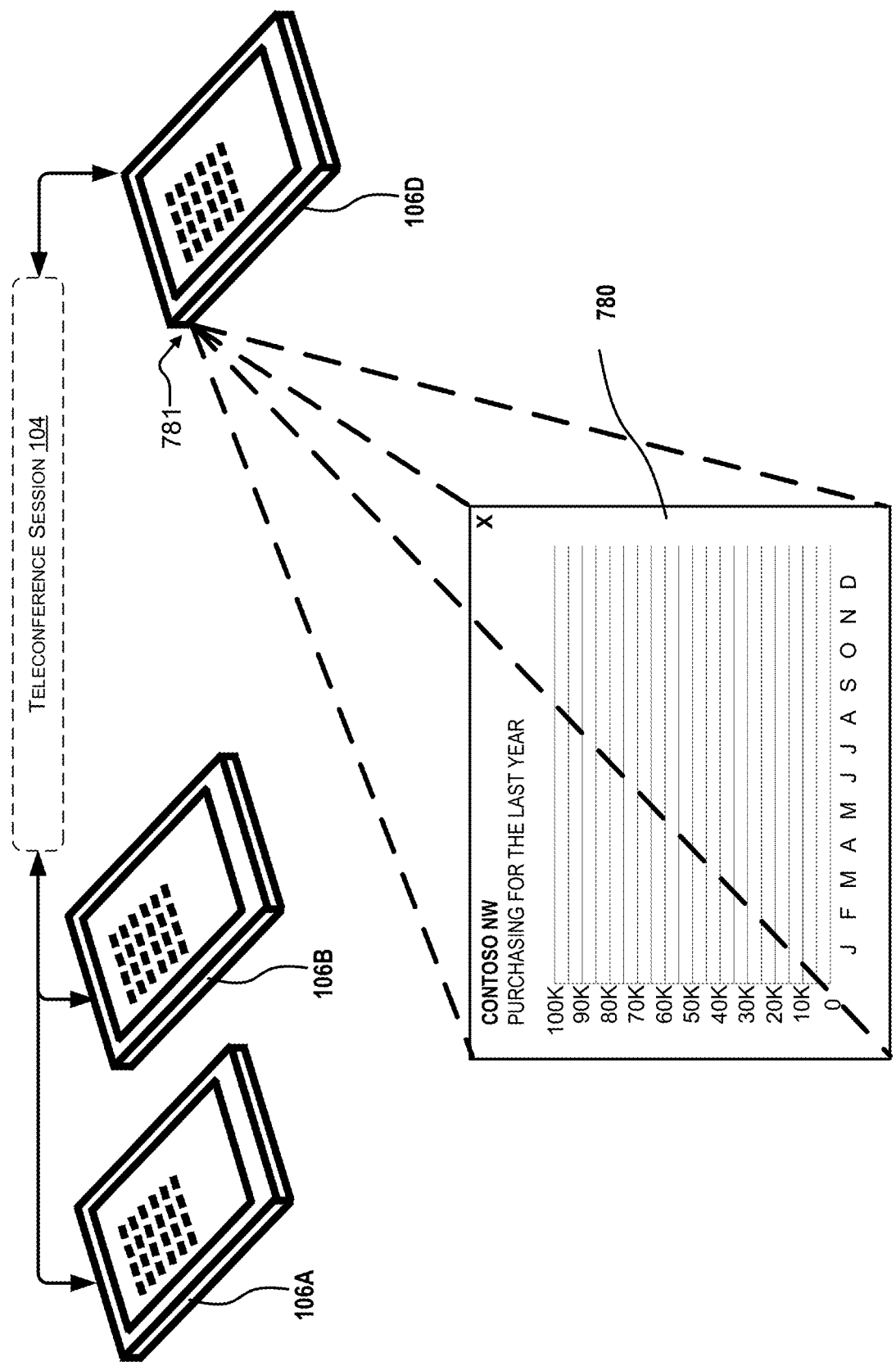
FIG. 7A illustrates an example user interface arrangement with shared content using a roving camera view of a secondary computing device.

Furthermore, although some devices have been described as "secondary," it should be understood that some features of the secondary devices can be leveraged to allow additional interaction and shareable content, much like a primary device. For example, as illustrated in FIGS. 7A-7D, one or more secondary devices may implement a shared camera or "roving camera" functionality to allow a meeting participant to offer a real-world view of content and a surrounding environment. In this example, a device 106D comprises a camera 781 suitable for streaming video data to the teleconference session 104. As the user directs the camera (referred to herein as a "roving camera") of the device 106D to content 780, the device 106D generates a video stream or photo that is communicated to the server module 136 for distribution of the content. The shared content can include a video stream or still images. With reference to the example of FIGS. 3A and 3B, FIG. 7A shows the fourth computing device 106D operating in the secondary mode of operation and generating image data via the camera 781. The image data is shared with devices of the teleconference session 104, such as the first computing device 106A and the second computing device 106B. Any content can be shared, including a whiteboard, a drawing, a photograph, a book page, or any other content from an analog environment. Thus, in this example, the teleconference system 102 can receive a request to share video content from a camera 781 of the computing device 106D. Furthermore, the teleconference system can add the video content to the teleconference data and the sub-portion of the teleconference data for sharing amongst the devices participating in the teleconference session 104.

Figure 7B:
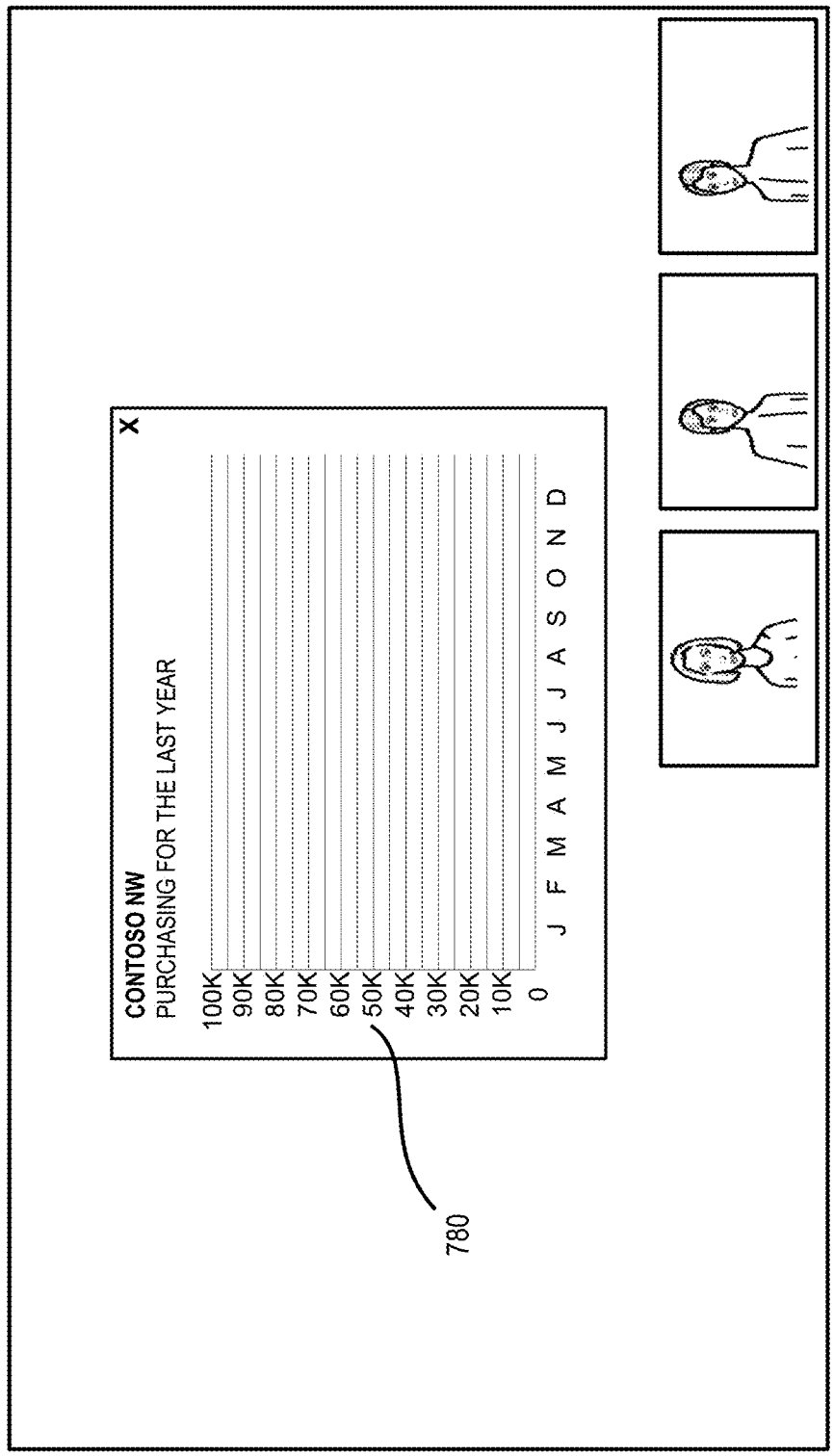
FIG. 7B illustrates an example user interface arrangement with shared content using a roving camera view of a primary computing device.
Figure 7C:
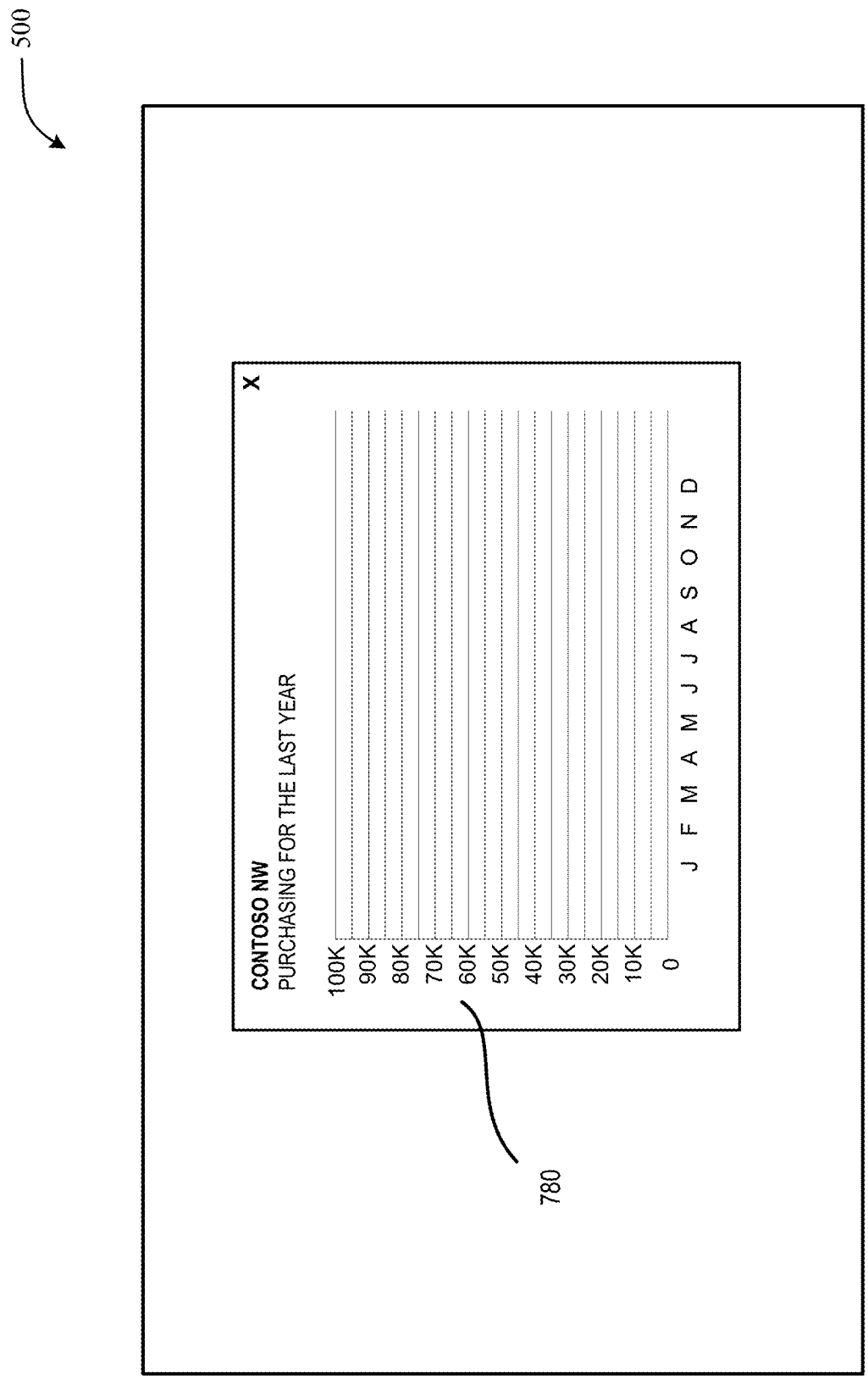
FIG. 7C illustrates an example user interface arrangement with shared content using a roving camera view of a secondary computing device.
Figure 7D:
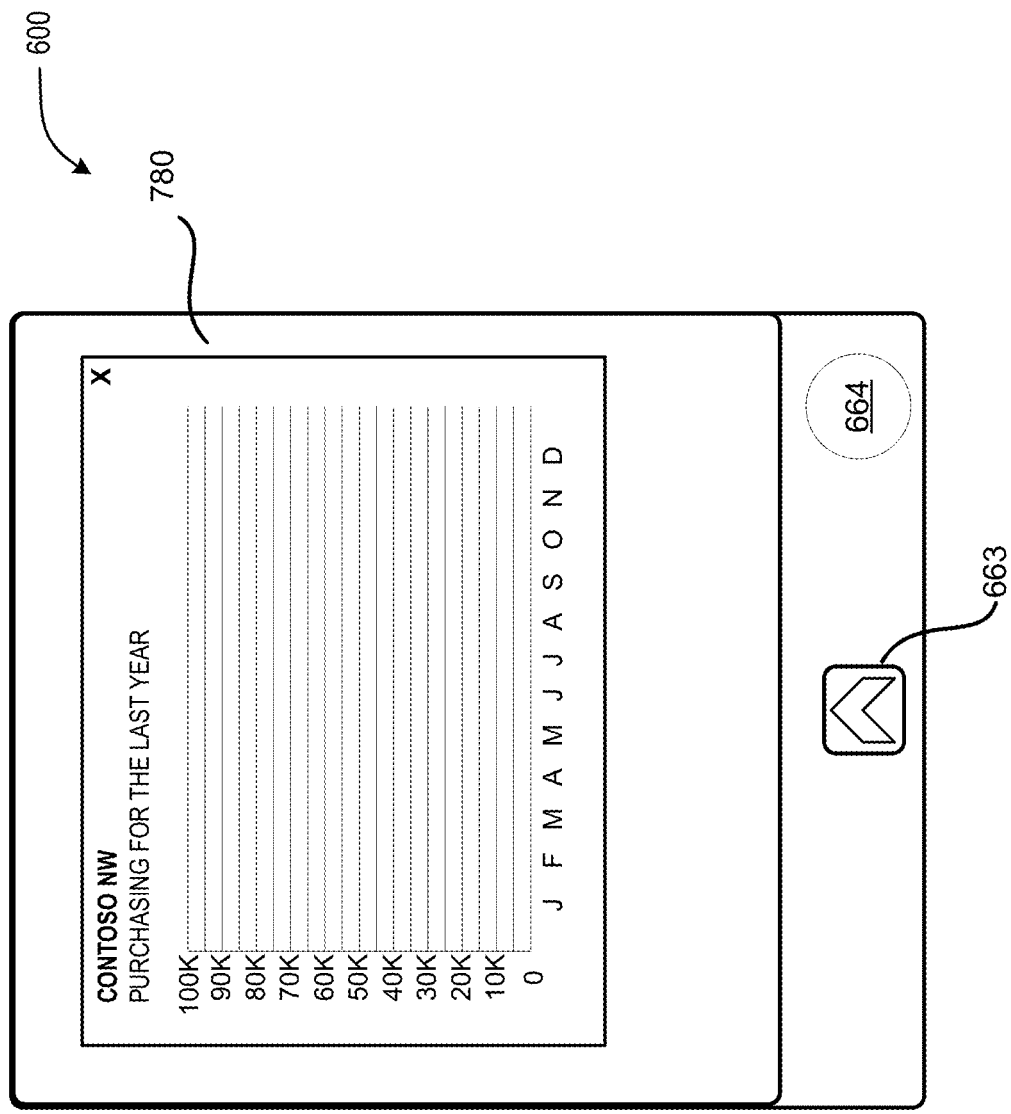
FIG. 7D illustrates an example user interface arrangement with shared content using a roving camera view of a secondary computing device.

Following this example, any user in an online meeting, e.g., a teleconference session 104, can send live video or a still image to a shared video stage that treats roving camera video as a content stream rather than as traditional egocentric participant stream (aka 'talking head' video). This feature might be triggered by a user using a secondary device to share real-world content or other content with meeting participants. As shown in FIG. 7B, the content 780 can be displayed at a primary device, such as primary device 106E using an overlay view. Other views, such as persistent views, can also be applicable. The secondary devices associated with the teleconference session 104 may also receive and display the content 780, as shown in FIGS. 7C and 7D. Accordingly, while a secondary device can be used to receive second teleconference data 146(2) or a sub-portion of teleconference data 146, a secondary device can also be used to augment teleconference sessions.

As described in detail above, real-time mediated collaboration, such as via an online meeting, videoconference, or a document collaboration system is typically accomplished using a combination of data from different resources disclosed herein. In current collaboration systems, if co-located devices are simultaneously joining it is possible the user experience is essentially duplicated across devices, and several forms of feedback, distractions, and other undesirable effects are apparent. This may have deleterious results for the user experience. At best in such a case audio feedback may be presented through "echoes" and "ghosting" of an audio stream. At worst this causes technical and practical problems, including but not limited to race conditions for synchronizations, notifications, control execution, audio echo and howl, battery drain, and extra bandwidth usage. This invention concerns the addition of second and third, up to an n number of co-located devices for multiple co-located devices which can be automatically differentiated upon join so as to augment the primary device experience rather than duplicate it. The invention distinguishes the states of any primary device in a real-time collaboration session from the states of any secondary devices that join the same session while co-located. Each device of the co-located devices can be associated with unique user identification in these examples.

Figure 8:
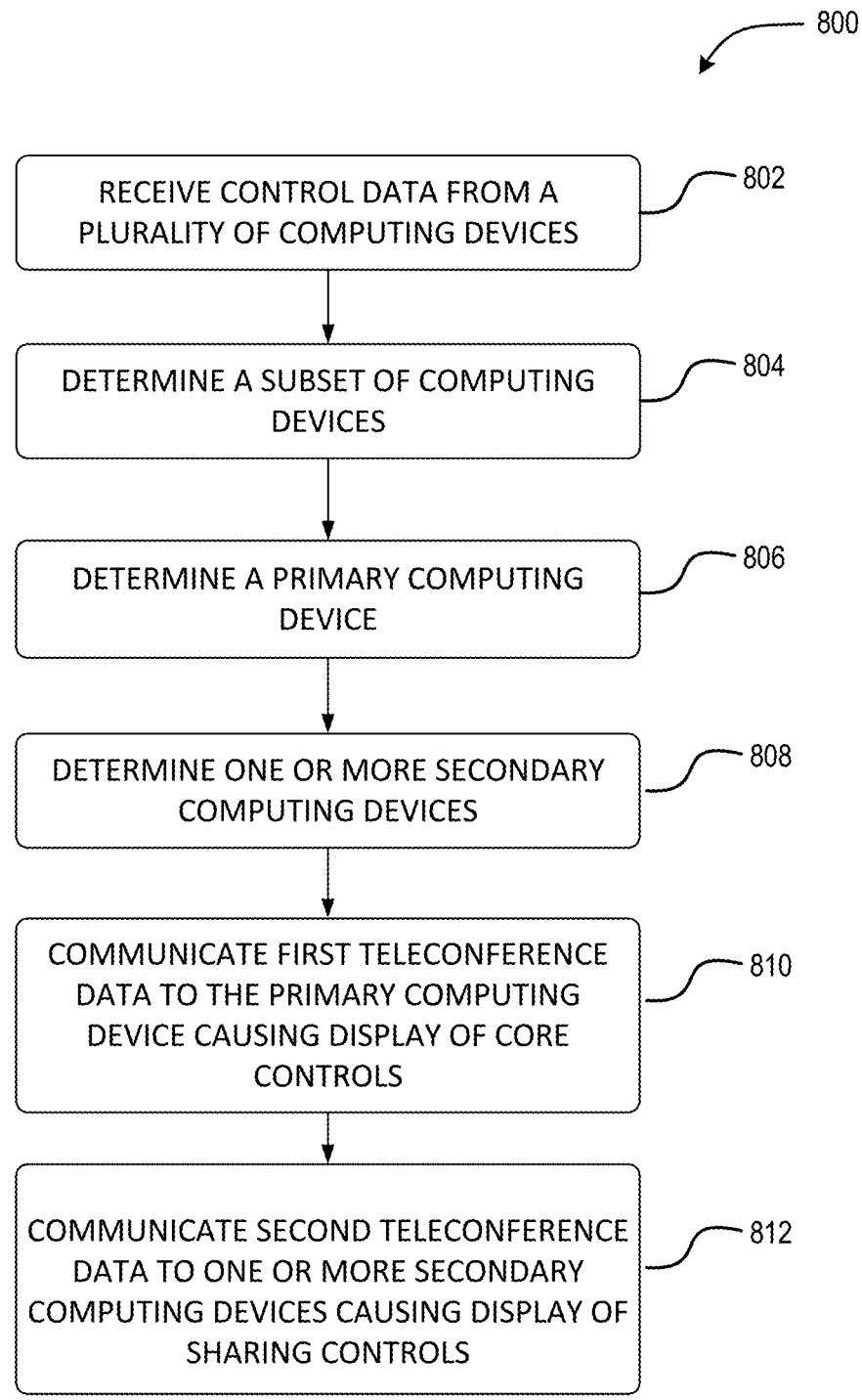
FIG. 8 is a flowchart of an example method of enhanced techniques for joining teleconference sessions, wherein the method comprises providing different control interfaces to primary and secondary devices.

Hereinafter, a more detailed description of operations of the teleconference system 102 is provided with reference to FIG. 8, which illustrates a flowchart of an example method 800 of enhanced techniques for joining teleconference sessions.

The method 800 may include receiving control data from a plurality of computing devices 375, wherein each computing device 106 of the plurality of computing devices 375 is associated with a different user identity for accessing a teleconference session 104, at block 802. Generally, the control can include data indicating locations of a plurality of computing devices and may be received by the teleconference system 102. For example, the data indicating the locations may be position signals 145 that can be interpreted to discern whether two or more computing devices are co-located, such as in the examples described with reference to FIGS. 3A and 3B. The data indicating locations of the plurality of computing devices can include social signals, audio signals, or positioning data. Generally, social signals include social network signals, calendar signals, contact listing signals, and contact relationship signals. Furthermore, positioning data can include at least one of data defining a GPS position, data defining a Bluetooth signal strength, data defining a Wi-Fi triangulation, data defining an ultrasound watermarking, or data defining a characteristic of a near field communication signal. It should be appreciated that other data indicating locations of the plurality of computing devices is also applicable.

Turning back to FIG. 8, the method 800 may further include determining a subset of computing devices 376 from the plurality of computing devices 375 based on based on at least one of social signals, audio signals, or positioning data, at block 804. For example, the teleconference system 102 may determine that a subset of computing devices of the plurality of computing devices are co-located based on the data indicating locations. Referring again to the examples described with reference to FIGS. 3A and 3B, the second location 310 includes one such subset 376 comprising devices 106B, 106C, 106D, and 106E. Accordingly, the subset of devices 376 are co-located in location 310.

The method 800 may also include determining a primary computing device 106E from the subset of computing devices 376 and one or more secondary computing devices 106B-106D from the subset of computing devices 376, at blocks 806 and 808, respectively. In one aspect, the teleconference system 102 can determine that the first computing device of the subset of computing devices is first to join the teleconference session. For example, if the device 106E of the subset was first to join the teleconference session 104, the device 106E may be selected as the primary device.

In a different aspect, the teleconference system 102 may consider other information, such as priority information in selecting the primary device. For example, the teleconference system 102 can analyze priority values associated with one or more computing devices of the subset of computing devices, and determine that the first computing device of the subset of computing devices has a priority value superseding priority values of the remaining computing devices of the subset of computing devices. The priority values may be stored as profile data 210, session data 144, or in profile module 132.

The method 800 may further include communicating a first teleconference data to the primary computing device, at block 810. For example, the teleconference system 102 can generate first teleconference data 146(1) associated with the teleconference session 104 and transmit the first teleconference data to the primary computing device. Additionally, the first teleconference data causes the primary computing device to display a first user interface arrangement 400 having core teleconference control elements 403 arranged thereon. The core teleconference control elements 403 are configured to control a state of the teleconference session 104.

The method 800 may further include communicating a second teleconference data 146(2) through 146(N) to the one or more secondary computing devices, at block 812. The second teleconference data causes the one or more secondary computing devices to display a second user interface arrangement 500 having sharing control elements 501. The sharing control elements 501 are configured to receive a selection of content to share from the one or more secondary computing devices. It is noted that other second user interface arrangements, such as the arrangement 600 are also applicable. For example, the user interface arrangement 600 also includes sharing control elements 651 and is configured for display on a secondary device.

In general, in configuring or generating the teleconference data 146, the first teleconference data 146(1), and/or the second teleconference data 146(1) through 146(N), the sub-portion of teleconference data or the second teleconference data 146(1) through 146(N) can be based on an activity level for data presented by participants of the teleconference session 104. The video or shared content in the media data for each participant may be analyzed to determine an activity level for any stream 142 received at the teleconference system 102. The activity level can be based on any type of activity including, but not limited to, any combination of the following:

1. participant motion—the extent to which a participant moves in a video may determine the participant's activity level. Participants in the process of gesturing or otherwise moving in the video may be deemed to be participating at a relatively high level in the teleconference.
2. participant lip motion—the video may be analyzed to determine the extent to which a participant's lips move as an indication of the extent to which the participant is speaking. Participants speaking at a relatively high level may be deemed to be participating at a corresponding relatively high level.
3. participant facial expressions—the participant's video may be analyzed to determine changes in facial expressions, or to determine specific facial expressions using pattern recognition. Participants reacting through facial expressions in the teleconference may be deemed to be participating at a relatively high level.
4. content modification—video of content being shared in the teleconference may be analyzed to determine if it is being modified. Thus, recently or actively modified content may have a high activity level.
5. content page turning—video of content being shared may be analyzed to determine if there is page turning of a document, for example, and assigned a corresponding activity level.
6. number of participants having content in a display area—video of content being shared may be assigned an activity level based on the number of participants that have a view of the content in a display area.
7. participant entering teleconference session—media data from participants entering a teleconference may be assigned a high activity level. This value can be based on the order in which participants join a session.
8. participant leaving teleconference session—media data from participants leaving a teleconference may be assigned a low activity level.

Thus, participant streams and/or content streams having a relatively high activity level can be chosen for display in any of the secondary user interface arrangements described above via communication of second teleconference data 146(1) through 146(N) or a sub-portion of the teleconference data 146 having the relatively high activity level. It is also understood that activity levels can be superseded based on other logic, for example, if a presenter desires a fixed view for secondary computing devices, or other scenarios.

Figure 9:
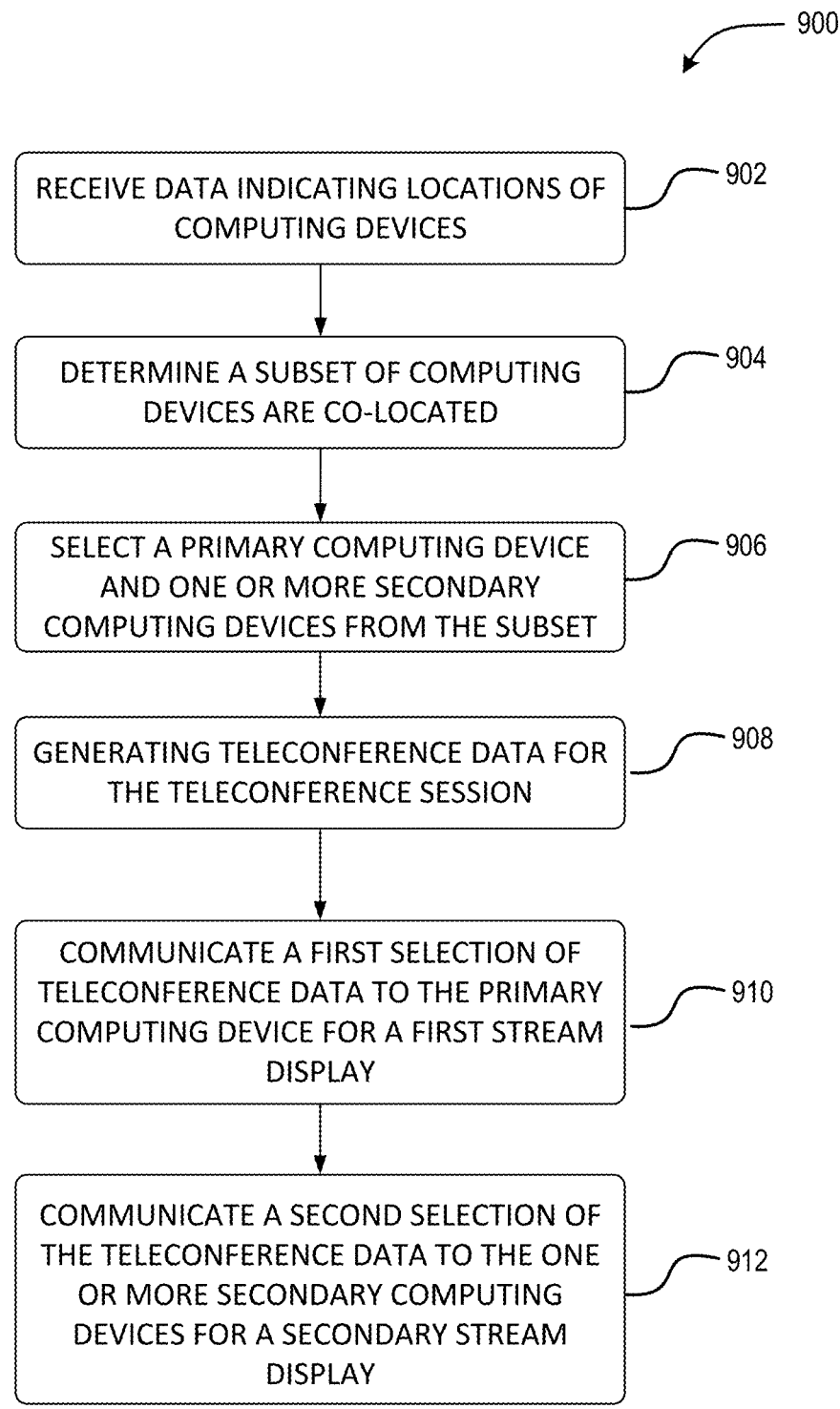
FIG. 9 is a flowchart of an example method of enhanced techniques for joining teleconference sessions, wherein the method comprises controlling one or more streams to primary and secondary devices.

Turning now to FIG. 9, a flowchart of an additional example method 900 of enhanced techniques for joining teleconference sessions is illustrated. The method 900 includes receiving data indicating locations of a plurality of computing devices 375, at block 902. For example, the data indicating locations may include any of the variations described in detail above. For example, the data indicating locations can include social signals, audio signals, or positioning data. Furthermore, the data indicating locations of the plurality of computing devices can include at least one of data defining a GPS position, data defining a Bluetooth signal strength, data defining a Wi-Fi triangulation, data defining an ultrasound watermarking, or data defining a characteristic of a near field communication signal.

The method 900 further includes determining that a subset of computing devices 376 of the plurality of computing devices 375 are co-located based on the data indicating locations, at block 904. The determination can include, for example, interpreting the data and implementing a thresholding algorithm to identify one or more groupings of computing devices within a threshold distance of each other. Upon determining that a portion of one co-located grouping are attempting to join a single teleconference session 104, the teleconference system 102 may identify that portion as the subset of devices that are co-located.

The method 900 further includes selecting a primary computing device 106E from the subset of computing devices 376 for operating in a primary mode of operation and one or more secondary computing devices 106B through 106D from the subset of computing devices 376 for operating in a secondary mode of operation, at block 906. For example, selecting the primary computing device can include determining that a computing device of the subset of computing devices is first to join the teleconference session. Additionally, selecting the primary computing device can include analyzing priority values associated with one or more computing devices of the subset of computing devices and determining that the computing device of the subset of computing devices has a priority value superseding priority values of the remaining computing devices of the subset of computing devices.

The method 900 further includes generating teleconference data 146 associated with a teleconference session 104, at block 908. The teleconference data 146 can be generated as described in detail above. For example, the teleconference data 146 can include one or more participant streams, one or more content streams, or other teleconference streams arranged similar to streams 142.

The method 900 further includes communicating a first selection of the teleconference data 146 to the primary computing device, at block 910. For example, the teleconference system 102 can direct a first selection of teleconference data 142 to one or more primary devices. In this example, a single primary device has been selected to receive the teleconference data 146. However, it is understood according to the scenarios described with reference to FIGS. 3A and 3B that more than one primary device may exist in a teleconference session 104. Another example of a first selection of teleconference data 146 may also include a plurality of streams 142, such as the rendered streams illustrated in the example shown in FIG. 4A. The first selection of teleconference data 146 can also cause the primary device to display core teleconference controls, such as the controls 403 shown in FIG. 4A.

The method 900 further includes communicating a, second selection of teleconference data 146, also referred to herein as a "sub-portion of the teleconference data 146," to the one or more secondary computing devices, at block 912. For example, the teleconference system 102 can direct a sub-portion of the teleconference data 146 to the one or more secondary devices. The sub-portion of the teleconference data 146 may include a single participant stream 142 or a content stream that is selected based at least in part on an activity level as described above. The sub-portion of the teleconference data 146 can also comprise a number of participant streams 142 and content streams individually ranked and selected based on an activity level. In some configurations, the sub-portion of the teleconference data 146 can comprise a selected stream of the plurality of streams described above as the first selection. According to other aspects, the teleconference system 102 can direct second teleconference data such as teleconference data 146(2) through 146(N) to the one or more secondary computing devices. Second teleconference data can also be selected based at least in part on an activity level as described above.

As described herein in detail, several aspects of enhancing teleconference sessions have been provided. Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

Clauses

The many features, aspects, and/or details explained above can be represented in one or more clauses as defined below:

Clause 1: A method, comprising, receiving control data from a plurality of computing devices (375), wherein each computing device (106) of the plurality of computing devices (375) is associated with a different user identity for accessing a teleconference session (104); determining a subset of computing devices (376) from the plurality of computing devices (375) based on at least one of social signals, audio signals, or positioning data; determining a primary computing device (106E) from the subset of computing devices (376) and one or more secondary computing devices (106B-106D) from the subset of computing devices (376); communicating a first teleconference data (146(1)) to the primary computing device (106E), the first teleconference data (146(1)) causing the primary computing device (106E) to display a first user interface arrangement (400) having core teleconference control elements (403), the core teleconference control elements (403) configured to control a state of the teleconference session (104); and communicating a second teleconference data (146(2)) to the one or more secondary computing devices (376), the second teleconference data (146(2)) causing the one or more secondary computing devices (376) to display a second user interface arrangement (500) having sharing control elements (501), the sharing control elements (501) configured to receive a selection of content to share from the one or more secondary computing devices (376).

Clause 2: A method as in clause 1, wherein the positioning data comprises at least one of data defining a GPS position, data defining a Bluetooth signal strength, data defining a Wi-Fi triangulation, data defining an ultrasound watermarking, or data defining a characteristic of a near field communication signal.

Clause 3: A method as in any of the clauses above, wherein the primary computing device is a first computing device of the subset of computing devices to join the teleconference session.

Clause 4: A method as in any of the clauses above, wherein analyzing the data comprises, analyzing priority values associated with one or more computing devices of the plurality of computing devices; and determining that the primary computing device has a priority value superseding priority values of the remaining computing devices.

Clause 5: A method as in any of the clauses above, wherein the method further comprises: disabling an audio component of one or more computing devices of the plurality of computing devices.

Clause 6: A method as in any of the clauses above, wherein the one or more secondary computing devices are configured to operate in a secondary mode of operation and the primary computing device is configured to operate in a primary mode of operation.

Clause 7: A method as in any of clauses 1-6, wherein the method further comprises, receiving a request from a first computing device of the one or more secondary computing devices to upgrade to the primary mode of operation; and communicating the first teleconference data to the first computing device.

Clause 8: A method as in any of the clauses above wherein the method further comprises: determining that a first computing device of the one or more secondary computing devices is no longer within the subset of computing devices; and communicating the first teleconference data to the first computing device.

Clause 9: A method as in any of the clauses above wherein the social signals comprise social network signals, calendar signals, contact listing signals, and contact relationship signals.

Clause 10: A method as in any of the clauses above, wherein the second user interface arrangement comprises a reduced user interface configured to display the sub-portion of teleconference data based at least in part on an activity level.

Clause 11: A method, comprising, receiving data indicating locations of a plurality of computing devices (375); determining that a subset of computing devices (376) of the plurality of computing devices (375) are co-located based on the data indicating locations; selecting a primary computing device (106E) from the subset of computing devices (376) for operating in a primary mode of operation and one or more secondary computing devices (106B-106D) from the subset of computing devices (376) for operating in a secondary mode of operation; generating teleconference data (146) comprising a plurality of streams (142) associated with a teleconference session (104); communicating the teleconference data (146) to the primary computing device (106E); and communicating a sub-portion of the teleconference data (146(2)) to the one or more secondary computing devices (106B-106D), wherein the sub-portion comprises a stream (142) that is selected form the plurality of streams (142) based on an activity level.

Clause 12: A method as in any of the clauses above, wherein the primary mode of operation comprises a rendering of a set of core teleconference control elements, the core teleconference control elements configured to control a state of the teleconference session.

Clause 13: A method as in any of the clauses above, wherein the secondary mode of operation comprises a rendering of a set of sharing control elements, the sharing control elements configured to receive a selection of content to share from the one or more secondary computing devices.

Clause 14: A method as in any of the clauses above, wherein selecting the primary computing device comprises: determining that a computing device of the subset of computing devices is first to join the teleconference session.

Clause 15: A method as in any of the clauses above, wherein selecting the primary computing device comprises: analyzing priority values associated with one or more computing devices of the subset of computing devices; and determining that a computing device of the subset of computing devices has a priority value superseding priority values of computing devices of the subset of computing devices.

Clause 16: A method as in any of the clauses above, wherein the method further comprises: disabling an audio component of the one or more secondary computing devices.

Clause 17: A method as in any of the clauses above, wherein the data indicating locations of the plurality of computing devices comprises social signals, audio signals, or positioning data.

Clause 18: A method as in any of the clauses above, wherein the positioning data comprises at least one of data defining a GPS position, data defining a Bluetooth signal strength, data defining a Wi-Fi triangulation, data defining an ultrasound watermarking, or data defining a characteristic of a near field communication signal.

Clause 19: A method as in any of the clauses above, further comprising: receiving a request to share video content from a camera of a computing device of the one or more secondary devices; and adding the video content to the teleconference data and the sub-portion of the teleconference data.

Clause 20, A method as in any of the clauses above, further comprising: determining that a computing device of the one or more secondary computing devices is no longer co-located; and communicating the teleconference data to the computing device.

Clause 21: A method as in any of the clauses above, wherein at least two computing devices of the plurality of computing devices are associated with different user identities.

Clause 22: A system comprising, one or more processing units; and a computer-readable medium having encoded thereon computer-executable instructions to cause the one or more processing units to receive control data from a plurality of computing devices (375); determine a subset of computing devices (376) from the plurality of computing devices (375) based on based on at least one of social signals, audio signals, or positioning data; determine a primary computing device (106E) from the subset of computing devices (376) and one or more secondary computing devices (106B-106D) from the subset of computing devices (376); communicate a first teleconference data (146(1)) to the primary computing device (106E), the first teleconference data (146(1) causing the primary computing device (106E) to display a first user interface arrangement (400) having core teleconference control elements (403), the core teleconference control elements (403) configured to control a state of the teleconference session (104); and communicate a second teleconference data (146(2)) to the one or more secondary computing devices (106B-106D), the second teleconference data (146(2)) causing the one or more secondary computing devices (106B-106D) to display a second user interface arrangement (500) having sharing control elements (501), the sharing control elements (501) configured to receive a selection of content to share from the one or more secondary computing devices (106B-106D).

Clause 23: A system as in clause 22, wherein the computer-executable instructions further cause the one or more processing units to receive a request from a computing device of the one or more secondary computing devices to upgrade to the primary mode of operation; and communicate the first teleconference data to the computing device.

Clause 24: A system as in any of clauses 22 and 23, wherein the computer-executable instructions further cause the one or more processing units to determine that a computing device of the one or more secondary computing devices is no longer within the subset of computing devices; and communicate the first teleconference data to the computing device.

Clause 25, A system as in any of the clauses above, wherein the one or more secondary computing devices are configured to operate in a secondary mode of operation and the primary computing device is configured to operate in a primary mode of operation.

The invention claimed is:

1. A method for processing by a system, comprising:
   transmitting communication data to a plurality of computing devices each associated with a different user identity, the communication data causing individual computing devices of the plurality of computing devices to display a first user interface arrangement displaying a rendering of a plurality of video streams;
   determining that a subset of computing devices of the plurality of computing devices are co-located based on positioning data indicating a location of individual devices of the subset of computing devices; and
   in response to determining that the subset of computing devices of the plurality of computing devices, each associated with different user identities, are co-located, selecting an individual computing device from the subset of computing devices to operate as a primary device, selecting at least one other computing device to operate as a secondary device,
      transmitting updated communication data to the at least one other computing device of the subset of computing devices each associated with different user identities, the updated communication data causing the at least one other computing device to operate as the secondary device and replace the first user interface arrangement displaying the rendering of the plurality of video streams with a second user interface arrangement displaying at least one stream selected from the plurality of video streams, and
      transmitting the communication data to the primary device causing the primary device to maintain the first user interface arrangement displaying the rendering of the plurality of video streams in the individual computing device from the subset of computing devices to operate as the primary device.

2. The method of claim 1, wherein the positioning data comprises at least one of data defining a GPS position, data defining a Bluetooth signal strength, data defining a Wi-Fi triangulation, data defining an ultrasound watermarking, or data defining a characteristic of a near field communication signal.

3. The method of claim 1, wherein the subset of computing devices of the plurality of computing devices are determined to be co-located in response to determining that the subset of computing devices are within a threshold distance of one other using the positioning data.

4. The method of claim 1, wherein the subset of computing devices of the plurality of computing devices are determined to be co-located in response to determining that the subset of computing devices are concurrently within a threshold distance of one other.

5. The method of claim 1, further comprising:
   causing at least one computing device of the plurality of computing devices to generate an audio signal;
   causing other computing device of the plurality of computing devices to detect the audio signal; and
   determining that the subset of the computing devices of the plurality of computing devices are co-located in response to the other computing device of the plurality of computing devices detecting the audio signal.

6. The method of claim 1, the determining that the subset of the computing devices of the plurality of computing devices are co-located in response to a detection of an audio signal conflict, wherein the audio signal conflict includes at least audio interference signals or audio feedback signals between the subset of the computing devices.

7. The method of claim 1, wherein the primary device is a first computing device of the subset of the computing devices to join a communication session.

8. A method for processing by a system, comprising:
   transmitting communication data to a plurality of computing devices each associated with a different user identity, the communication data causing individual computing of the plurality of computing devices to display a first user interface arrangement comprising a first set of selectable control elements;
   determining that a subset of computing devices of the plurality of computing devices are co-located based on positioning data indicating a location of individual devices of the subset of computing devices; and
   in response to determining that the subset of computing devices of the plurality of computing devices, each associated with different user identities, are co-located, selecting an individual computing device from the subset of computing devices to operate as a primary device, selecting at least one other computing device to operate as a secondary device,
      transmitting the communication data to the individual computing device causing the individual computing device to operate as the primary device and to continue displaying the first user interface arrangement comprising the first set of selectable control elements, and
      transmitting updated communication data to the at least one other computing device of the subset of computing devices each associated with different user identities, the updated communication data causing the at least one other computing device to operate as the secondary device and replace the first user interface arrangement comprising the first set of selectable control elements with a second user interface arrangement comprising a second set of selectable control elements that are different than the first set of selectable control elements.

9. The method of claim 8, wherein the positioning data comprises at least one of data defining a GPS position, data defining a Bluetooth signal strength, data defining a Wi-Fi triangulation, data defining an ultrasound watermarking, or data defining a characteristic of a near field communication signal.

10. The method of claim 8, wherein the subset of computing devices of the plurality of computing devices are determined to be co-located in response to determining that the subset of computing devices are within a threshold distance of one other using the positioning data.

11. The method of claim 8, further comprising:
   causing at least one computing device of the plurality of computing devices to generate an audio signal;
   causing other computing device of the plurality of computing devices to detect the audio signal; and determining that the subset of the computing devices of the plurality of computing devices are co-located in response to the other computing device of the plurality of computing devices detecting the audio signal.

12. The method of claim 8, the determining that the subset of the computing devices of the plurality of computing devices are co-located in response to a detection of an audio signal conflict, wherein the audio signal conflict includes at least audio interference signals or audio feedback signals between the subset of the computing devices.

13. The method of claim 8, wherein the subset of computing devices of the plurality of computing devices are determined to be co-located in response to determining that the subset of computing devices are within a threshold distance of one other using an audio signal conflict between each computing device of the subset of computing devices.

14. The method of claim 8, wherein the first set of selectable control elements controls a state of a communication session between the subset of the computing devices.

15. The method of claim 8, wherein the second set of selectable control elements control sharing of content between the subset of the computing devices.

16. A computer storage media storing instructions that cause a processor of a computing device to:
   transmit communication data to a plurality of computing devices each associated with a different user identity, the communication data causing individual computing devices of the plurality of computing devices to display a first user interface arrangement displaying a rendering of a plurality of video streams;
   determine that a subset of computing devices of the plurality of computing devices are co-located based on positioning data indicating a location of individual devices of the subset of computing devices; and
   in response to determining that the subset of computing devices of the plurality of computing devices, each associated with different user identities, are co-located, select an individual computing device from the subset of computing devices to operate as a primary device, select at least one other computing device to operate as a secondary device,
   transmit updated communication data to the at least one other computing device of the subset of computing devices each associated with different user identities, the updated communication data causing the at least one other computing device to operate as the secondary device and replace the first user interface arrangement displaying the rendering of the plurality of video streams with a second user interface arrangement displaying at least one stream selected from the plurality of video streams.

17. The computer storage media of claim 16, wherein the positioning data comprises at least one of data defining a GPS position, data defining a Bluetooth signal strength, data defining a Wi-Fi triangulation, data defining an ultrasound watermarking, or data defining a characteristic of a near field communication signal.

18. The computer storage media of claim 16, wherein the subset of computing devices of the plurality of computing devices are determined to be co-located in response to determining that the subset of computing devices are within a threshold distance of one other using the positioning data.

19. The computer storage media of claim 16, wherein the subset of computing devices of the plurality of computing devices are determined to be co-located in response to determining that the subset of computing devices are concurrently within a threshold distance of one other.

20. The computer storage media readable medium of claim 16, further comprising:
   cause at least one computing device of the plurality of computing devices to generate an audio signal;
   cause other computing device of the plurality of computing devices to detect the audio signal; and
   determine that the subset of the computing devices of the plurality of computing devices are co-located in response to the other computing device of the plurality of computing devices detecting the audio signal.

* * * * *